(12) United States Patent
Kim et al.

(10) Patent No.: US 11,595,643 B2
(45) Date of Patent: *Feb. 28, 2023

(54) ENCODING METHOD AND DECODING METHOD, AND DEVICE USING SAME

(71) Applicants: Electronics and Telecommunications Research Institute, Daejeon (KR); University-Industry Cooperation Group of Kyung Hee University, Yongin-si (KR)

(72) Inventors: Hui Yong Kim, Daejeon (KR); Gwang Hoon Park, Seongnam-si (KR); Kyung Yong Kim, Suwon-si (KR); Sung Chang Lim, Daejeon (KR); Jin Ho Lee, Daejeon (KR); Jin Soo Choi, Daejeon (KR); Jin Woong Kim, Daejeon (KR)

(73) Assignees: Electronics and Telecommunications Research Institute, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,057

(22) Filed: Mar. 29, 2022

(65) Prior Publication Data
US 2022/0224892 A1 Jul. 14, 2022

Related U.S. Application Data

(63) Continuation of application No. 14/388,514, filed as application No. PCT/KR2013/003207 on Apr. 16, 2013, now Pat. No. 11,323,699.

(30) Foreign Application Priority Data

Apr. 16, 2012 (KR) .................. 10-2012-0039444
Apr. 17, 2012 (KR) .................. 10-2012-0039622

(Continued)

(51) Int. Cl.
H04N 19/12 (2014.01)
H04N 19/11 (2014.01)
(Continued)

(52) U.S. Cl.
CPC ............ *H04N 19/11* (2014.11); *H04N 19/12* (2014.11); *H04N 19/129* (2014.11);
(Continued)

(58) Field of Classification Search
CPC ...... H04N 19/129; H04N 19/61; H04N 19/17; H04N 19/184; H04N 19/34; H04N 19/187;
(Continued)

(56) References Cited

U.S. PATENT DOCUMENTS 6,341,144 B1 1/2002 Haskell et al.
8,885,701 B2 11/2014 Saxena et al.
(Continued)

FOREIGN PATENT DOCUMENTS

CN 1756365 A 4/2006
CN 1777283 A 5/2006
(Continued)

OTHER PUBLICATIONS

Puri, A. et al., "Improvements in DCT-based video coding," International Society for Optics and Photonics, Electronic Imaging, SPIE vol. 3024, 1997 (13 pages).
(Continued)

*Primary Examiner* — Ayman A Abaza
(74) *Attorney, Agent, or Firm* — NSIP Law

(57) ABSTRACT

The present invention relates to an encoding method and decoding method, and a device using the same. The encoding method according to the present invention comprises the steps of: specifying an intra prediction mode for a current block; and scanning a residual signal by intra prediction of the current block, wherein the step of scanning the residual signal can determine a scanning type for a luminance signal (Continued)

and a chroma signal of the current block according to an intra prediction mode for a luminance sample of the current block.

3 Claims, 25 Drawing Sheets

(30) Foreign Application Priority Data

Apr. 17, 2012 (KR) .................. 10-2012-0040015
Apr. 25, 2012 (KR) .................. 10-2012-0043456
Apr. 16, 2013 (KR) .................. 10-2013-0041906

(51) Int. Cl.
*H04N 19/176* (2014.01)
*H04N 19/129* (2014.01)
*H04N 19/186* (2014.01)
*H04N 19/159* (2014.01)
*H04N 19/18* (2014.01)
*H04N 19/61* (2014.01)
*H04N 19/96* (2014.01)

(52) U.S. Cl.
CPC ......... *H04N 19/159* (2014.11); *H04N 19/176* (2014.11); *H04N 19/18* (2014.11); *H04N 19/186* (2014.11); *H04N 19/61* (2014.11); *H04N 19/96* (2014.11)

(58) Field of Classification Search
CPC .... H04N 19/29; H04N 19/176; H04N 19/105; H04N 19/11; H04N 19/18; H04N 19/593; H04N 19/112; H04N 19/126; H04N 19/154; H04N 19/46; H04N 19/12; H04N 19/159; H04N 19/107; H04N 19/115; H04N 19/119; H04N 19/122; H04N 19/132; H04N 19/136; H04N 19/14; H04N 19/186; H04N 19/196; H04N 19/21; H04N 19/463; H04N 19/543; H04N 19/56; H04N 19/60; H04N 19/70; H04N 19/96
USPC .................................................. 375/240.02
See application file for complete search history.

(56) References Cited

U.S. PATENT DOCUMENTS

| | | | |
|---|---|---|---|
| 9,661,338 B2 | 5/2017 | Karczewicz et al. | |
| 2008/0285644 A1 | 11/2008 | Seo et al. | |
| 2010/0284459 A1 | 11/2010 | Jeong et al. | |
| 2011/0249721 A1 | 10/2011 | Karczewicz et al. | |
| 2011/0286516 A1 | 11/2011 | Lim et al. | |
| 2012/0008675 A1 | 1/2012 | Karczewicz et al. | |
| 2012/0057630 A1 | 3/2012 | Saxena et al. | |
| 2013/0003856 A1* | 1/2013 | Saxena ................. | H04N 19/12 375/240.18 |
| 2015/0124876 A1* | 5/2015 | Lee ..................... | H04N 19/176 375/240.12 |
| 2015/0296223 A1 | 10/2015 | Seo et al. | |

FOREIGN PATENT DOCUMENTS

| | | | | |
|---|---|---|---|---|
| CN | 102065298 A | 5/2011 | | |
| CN | 102223525 A | 10/2011 | | |
| EP | 2 285 117 A1 | 2/2011 | | |
| GB | 2 210 229 A | 6/1989 | | |
| JP | 1-129589 A | 5/1989 | | |
| JP | 4166305 B2 | 10/2008 | | |
| JP | 2011-223068 A | 11/2011 | | |
| JP | 5620641 B2 | 11/2014 | | |
| JP | 5914680 B2 | 5/2016 | | |
| KR | 10-2008-0099835 A | 11/2008 | | |
| KR | 10-1010722 B1 | 1/2011 | | |
| KR | 10-1095938 B1 | 12/2011 | | |
| KR | 10-2012-0035126 A | 4/2012 | | |
| WO | WO 03/084076 A1 | 10/2003 | | |
| WO | WO 2007/046644 A1 | 4/2007 | | |
| WO | WO-2007046644 A1 * | 4/2007 | ........... H04N 19/103 | |
| WO | WO 2013/064100 A1 | 5/2013 | | |

OTHER PUBLICATIONS

Zheng, Yunfei, et al. "CE11: Mode Dependent Coefficient Scanning", *Joint Collaborative Team on Video Coding (JCT-VC) of ITU-T SG16 WP3 and ISO/IEC JTC1/SC29/WG11 4th Meeting*, Daegu, Korea, Jan. 20-28, 2011 (5 pages in English).

Joshi, Rajan, et al., "CE7: Mode dependent intra residual coding", *Joint Collaborative Team on Video Coding (JCT-VC) of ITU-T SG16 WP3 and ISO/IEC JTC1/SC29/WG11*, 5th Meeting, Geneva, CH, Mar. 16-23, 2011 (9 pages in English).

Kim, Tae Ho, et al., "Efficient Block Mode Decision and Prediction Mode Selection for Fast Intra Prediction in H.264/AVC High Profile", Summer Conference of KOSBE (2011):574-577.

Yoo, Sung-Eun, et al., "Adaptive chroma scanning order decision using correlation of luma with chroma", Summer Conference of KOSBE (2011): 592-594.

Bross, B. et al., "High efficiency video coding (HEVC) text specification draft 8." Proceedings of 8th Meeting of Joint Collaborative Team on Video Coding (JCT-VC) or ITU-T SG16 WP3 and ISO/IEC JTC1/SC29/WG11 held Feb. 1-10, 2012 in San Jose, California, Document No. JCTVC-H1003 (10 pages).

K. Ugur and A. Saxena, Summary Report of Core Experiment on Intra Transform Mode Dependency Simplifications, document JCTVC-J0021, ITU-T & ISO/IEC, Stockholm, Sweden, Jul. 2012.

International Search Report dated Jul. 29, 2013 in counterpart international Application No. PCT/KR2013/003207 (5 pages, in Korean, with complete English Translation).

Choi, Jongbum, et al., "AHG15 : Independent control of Max CU and LCU for small LCU", Joint Collaborative Team on Video Coding (JCT-VC) of ITU-T SG16 WP3 and ISO/IEC JTC1/SC29/WG11, 8th Meeting: San Jose, California, United States of America, Feb. 1-10, 2012 (4 pages in English).

Saxena et al. "CE7: Mode-dependent DCT/DST for intra prediction in video coding," Joint Collaborative Team on Video Coding (JCT-VC) of ITU-T SG16 WP3 and ISO/IEC JTC1/SC29/WG11, Document: JCTVC-D033, 4th Meeting, Daegu, Republic of Korea, Jan. 20-28, 2011 (8 pages in English).

Bros, Benjamin. "WD4: Working draft 4 of high-efficiency video coding." *ITU-T SG16 WP3 and ISO/IEC JTC1/SC29/WG11 6th Meeting*, Torino, IT, Jul. 2011. (214 pages in English).

* cited by examiner (a)

(b)

ENCODING METHOD AND DECODING METHOD, AND DEVICE USING SAME

This application is a Continuation Application of U.S. application Ser. No. 14/388,514, filed on Sep. 26, 2014, which is a national stage application under 35 USC 371 of International Application No. PCT/KR2013/003207 filed on Apr. 16, 2013, which claims the benefit of Korean Application No. 10-2012-0039444 filed on Apr. 16, 2012, Korean Application No. 10-2012-0040015 filed on Apr. 17, 2012, Korean Application No. 10-2012-0039622 filed on Apr. 17, 2012, Korean Application No. 10-2012-0043456 filed on Apr. 25, 2012, and Korean Application No. 10-2013-0041906 filed on Apr. 16, 2013, in the Korean Intellectual Property Office, the entire disclosures of which are incorporated herein by reference for all purposes.

TECHNICAL FIELD

The present invention relates to video encoding and decoding technology and, more particularly, to a method of determining a frequency transform method and/or a scanning method for a chroma signal and an apparatus using the method.

BACKGROUND ART

As broadcast having High Definition (HD) resolution is extended and served nationwide and worldwide, many users are being accustomed to images having high resolution and high picture quality. Accordingly, lots of institutes are giving impetus to the development of the next-image device.

As there is a growing interest in Ultra High Definition (UHD) having resolution 4 times higher than HDTV along with HDTV, there is a need for technology in which an image having higher resolution and higher picture quality is compressed and processed.

In order to compress an image, information about the pixels of a current picture can be encoded by prediction. For example, inter-prediction technology in which a value of a pixel included in a current picture is predicted from temporally anterior and/or posterior pictures and/or intra-prediction technology in which a value of a pixel included in a current picture is predicted using information about a pixel included in the current picture can be used.

Pixel information includes a luma signal regarding luma and a chroma signal regarding chroma. A luma signal and a chroma signal may be handled equally or differently depending on the fact that a human being' sense of sight is more sensitive to luma.

Accordingly, a method of effectively handling a chroma signal and a luma signal separately is problematic.

DISCLOSURE

Technical Problem

An object of the present invention is to provide a method and apparatus for increasing encoding/decoding efficiency in video encoding/decoding.

Another object of the present invention is to provide an efficient frequency transform method and apparatus for a chroma signal and an efficient scanning method and apparatus for a chroma signal.

Technical Solution

In an aspect of the present invention, in selecting a frequency transform method and a scanning method for a chroma signal, a different frequency transform method can be used depending on an intra-prediction mode of a chroma signal and a different scanning method may be determined depending on an intra-prediction mode.

In another aspect of the present invention, a scanning type for the luma signal and the chroma signal of a current block can be determined by an intra-prediction mode for the luma sample of the current block.

Here, a scanning type for a luma signal can be equally used as a scanning type for a chroma signal. In another embodiment, a scanning type for a chroma signal may be determined using the same method as a method of determining a scanning type for a luma signal can be used.

Advantageous Effects

In accordance with the present invention, encoding/decoding efficiency can be improved in video encoding/decoding. More particularly, according to the present invention, frequency transform and/or scan for a chroma signal can be performed efficiently.

Furthermore, in selecting a frequency transform method and a scanning method for a chroma signal, the encoding efficiency of the residual signal of the chroma signal can be improved using a method and apparatus for applying a frequency transform method to the chroma signal depending on an intra-prediction direction mode of the chroma signal and deriving a scanning direction for the chroma signal.

MODE FOR INVENTION

Some exemplary embodiments of the present invention are described in detail with reference to the accompanying drawings. Furthermore, in describing the embodiments of this specification, a detailed description of the known functions and constitutions will be omitted if it is deemed to make the gist of the present invention unnecessarily vague.

In this specification, when it is said that one element is 'connected' or 'coupled' with the other element, it may mean that the one element may be directly connected or coupled with the other element or a third element may be 'connected' or 'coupled' between the two elements. Furthermore, in this specification, when it is said that a specific element is 'included', it may mean that elements other than the specific element are not excluded and that additional elements may be included in the embodiments of the present invention or the scope of the technical spirit of the present invention.

Terms, such as the first and the second, may be used to describe various elements, but the elements are not restricted by the terms. The terms are used to only distinguish one element from the other element. For example, a first element may be named a second element without departing from the scope of the present invention. Likewise, a second element may be named a first element.

Furthermore, element modules described in the embodiments of the present invention are independently shown to indicate different and characteristic functions, and it does not mean that each of the element modules is formed of a piece of separate hardware or a piece of software. That is, the element modules are arranged and included, for convenience of description, and at least two of the element modules may form one element module or one element may be divided into a plurality of element modules and the plurality of divided element modules may perform functions. An embodiment into which the elements are integrated or embodiments from which some elements are separated are also included in the scope of the present invention, unless they depart from the essence of the present invention.

Furthermore, in the present invention, some elements are not essential elements for performing essential functions, but may be optional elements for improving only performance. The present invention may be implemented using only essential elements for implementing the essence of the present invention other than elements used to improve only performance, and a structure including only essential elements other than optional elements used to improve only performance is included in the scope of the present invention.

Figure 1:
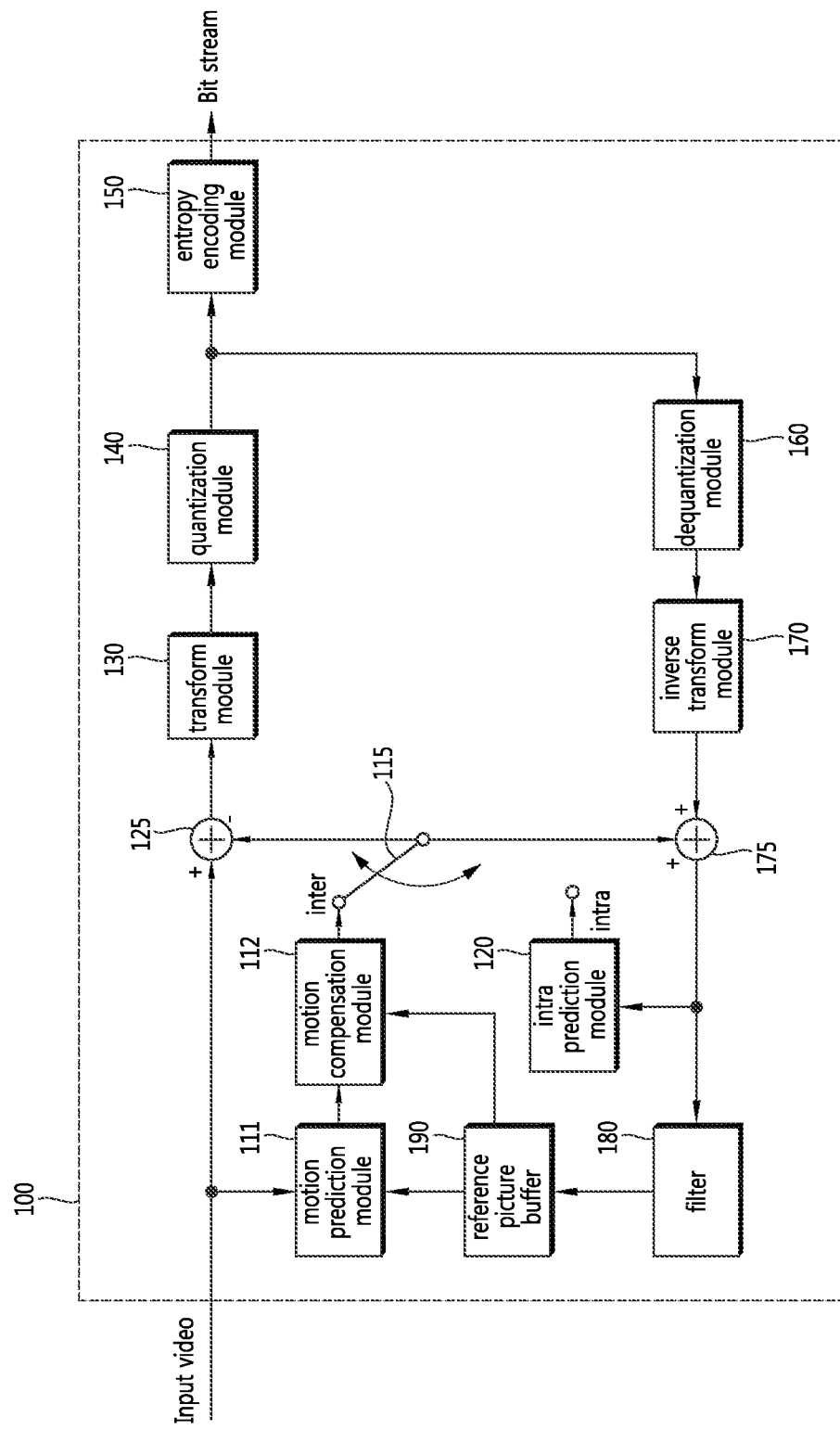
FIG. 1 is a block diagram showing the construction of a video encoding apparatus in accordance with an embodiment of the present invention.

FIG. 1 is a block diagram showing the construction of a video encoding apparatus in accordance with an embodiment of the present invention.

Referring to FIG. 1, the video encoding apparatus 100 includes a motion prediction module 111, a motion compensation module 112, an intra-prediction module 120, a switch 115, a subtractor 125, a transform module 130, a quantization module 140, an entropy encoding module 150, a dequantization module 160, an inverse transform module 170, an adder 175, a filter module 180, and a reference picture buffer 190.

The video encoding apparatus 100 can perform encoding on an input picture in intra-mode or inter-mode and output a bit stream as a result of the encoding. In this specification intra-prediction has the same meaning as intra-frame prediction, and inter-prediction has the same meaning as inter-frame prediction. In the case of intra-mode, the switch 115 can switch to intra mode. In the case of inter-mode, the switch 115 can switch to inter-mode. The video encoding apparatus 100 can generate a prediction block for the input block of an input picture and then encode the residual between the input block and the prediction block. Here, the input picture can mean the original picture.

In the case of intra-mode, the intra-prediction module 120 can generate the prediction block by performing spatial prediction using values of the pixels of an already encoded block neighboring a current block.

In the case of inter-mode, the motion prediction module 111 can obtain a motion vector by searching a reference picture, stored in the reference picture buffer 190, for a region that is most well matched with the input block in a motion prediction process. The motion compensation module 112 can generate the prediction block by performing motion compensation using the motion vector and the reference picture stored in the reference picture buffer 190. Here, the motion vector is a two-dimensional (2-D) vector used in inter-prediction, and the motion vector can indicate an offset between a current block and a block within a reference picture.

The subtractor 125 can generate a residual block based on the residual between the input block and the generated prediction block. The transform module 130 can perform transform on the residual block and output a transform coefficient according to the transformed block. Furthermore, the quantization module 140 can output a quantized coefficient by quantizing the received transform coefficient using at least one of a quantization parameter and a quantization matrix. Here, the quantization matrix can be inputted to an encoder, and the inputted quantization matrix can be determined to be used in the encoder.

The entropy encoding module 150 can perform entropy encoding based on values calculated by the quantization module 140 or an encoding parameter value calculated in an encoding process and output a bit stream according to the entropy encoding. If entropy encoding is used, the size of a bit stream for a symbol to be encoded can be reduced because the symbol is represented by allocating a small number of bits to a symbol having a high incidence and a large number of bits to a symbol having a low incidence. Accordingly, the compression performance of video encoding can be improved through entropy encoding. The entropy encoding module 150 can use such encoding methods as exponential Golomb, Context-Adaptive Binary Arithmetic Coding (CABAC), and Context-Adaptive Binary Arithmetic Coding (CABAC) for the entropy encoding.

The video encoding apparatus according to the embodiment of FIG. 1 performs inter-prediction encoding, that is, inter-frame prediction encoding, and thus a currently encoded picture needs to be decoded and stored in order to be used as a reference picture. Accordingly, a quantized coefficient is dequantized by the dequantization module 160 and is then inversely transformed by the inverse transform module 170. The dequantized and inversely transformed coefficient is added to the prediction block through the adder 175, thereby generating a reconstructed block.

The reconstructed block experiences the filter module 180. The filter module 180 can apply one or more of a deblocking filter, a Sample Adaptive Offset (SAO), and an Adaptive Loop Filter (ALF) to the reconstructed block or the reconstructed picture. The filter module 180 may also be called an adaptive in-loop filter. The deblocking filter can remove block distortion generated at the boundary of blocks. The SAO can add a proper offset value to a pixel value in order to compensate for a coding error. The ALF can perform filtering based on a value obtained by comparing a reconstructed picture with the original picture. The reconstructed block that has experienced the filter module 180 can be stored in the reference picture buffer 190.

Figure 2:
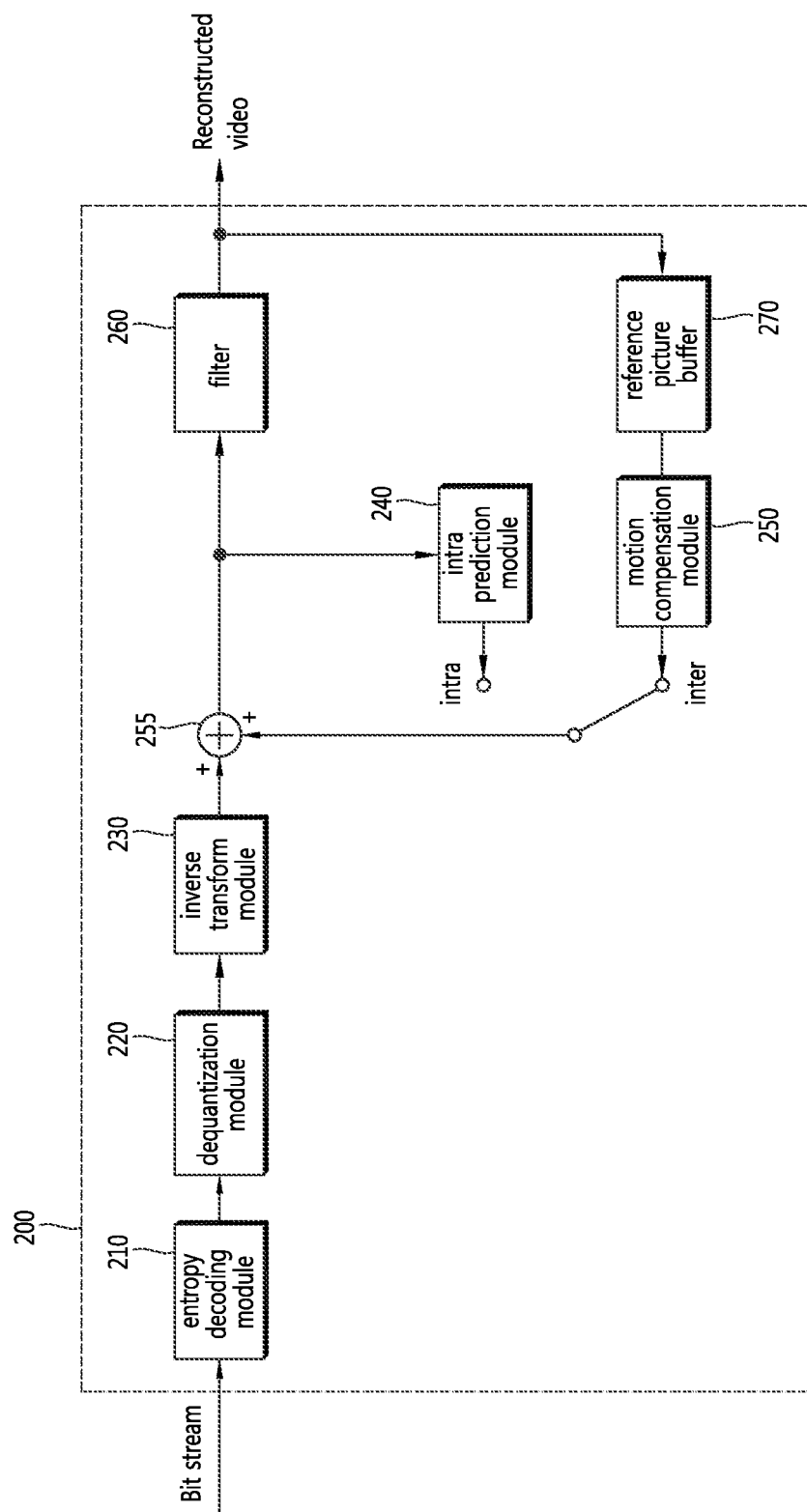
FIG. 2 is a block diagram showing the construction of a video decoding apparatus in accordance with an embodiment of the present invention.

FIG. 2 is a block diagram showing the construction of a video decoding apparatus in accordance with an embodiment of the present invention.

Referring to FIG. 2, the video decoding apparatus 200 includes an entropy decoding module 210, a dequantization module 220, an inverse transform module 230, an intra-prediction module 240, a motion compensation module 250, a filter module 260, and a reference picture buffer 270.

The video decoding apparatus 200 can receive a bit stream outputted from an encoder, perform decoding on the bit stream in intra-mode or inter-mode, and output a reconstructed picture, that is, a restored picture. In the case of intra-mode, a switch can switch to intra-mode. In the case of inter-mode, the switch can switch to inter-mode.

The video decoding apparatus 200 can obtain a reconstructed residual block from the received bit stream, generate a prediction block, and then generate a reconstructed block, that is, a restored, by adding the reconstructed residual block to the prediction block.

The entropy decoding module 210 can generate symbols including a symbol having a quantized coefficient form by performing entropy decoding on the received bit stream according to a probability distribution. In this case, an entropy decoding method is similar to the aforementioned entropy encoding method.

If an entropy decoding method is used, the size of a bit stream for each symbol can be reduced because the symbol is represented by allocating a small number of bits to a symbol having a high incidence and a large number of bits to a symbol having a low incidence.

The quantized coefficient is dequantized by the dequantization module 220 and is inversely transformed by the inverse transform module 230. As a result of the dequantization/inverse transform of the quantized coefficient, a reconstructed residual block can be generated.

The quantization matrix used in dequantization is also called a scaling list. The dequantization module 220 can generate a dequantized coefficient by applying the quantization matrix to a quantized coefficient.

Here, the dequantization module 220 can perform dequantization in response to quantization used in an encoder. For example, the dequantization module 220 can perform dequantization by inversely applying a quantization matrix, used in an encoder, to a quantized coefficient.

The quantization matrix used in dequantization in the video decoding apparatus 200 may be received from the bit stream, or a default matrix already included in an encoder and/or a decoder may be used as the quantization matrix used in dequantization in the video decoding apparatus 200. Information about a transmitted quantization matrix can be received through a sequence parameter set or a picture parameter set for each transform block size to which a quantization matrix size or a quantization matrix is applied. For example, 4×4 quantization matrices for a 4×4 transform block can be reduced, 8×8 matrices for an 8×8 transform block can be reduced, 16×16 matrices for a 16×16 transform block can be reduced, and 32×32 matrices for a 32×32 transform block can be reduced.

In the case of intra-mode, the intra-prediction module 240 can generate a prediction block by performing spatial prediction using pixel values of an already decoded block neighboring a current block. In the case of inter-mode, the motion compensation module 250 can generate a prediction block by performing motion compensation using a motion vector and a reference picture stored in the reference picture buffer 270.

The residual block and the prediction block are added together by an adder 255. The added block experiences the filter module 260. The filter module 260 can apply at least one of a deblocking filter, an SAO, and an ALF to the reconstructed block or the reconstructed picture. The filter module 260 outputs a reconstructed picture, that is, a reconstructed picture. The reconstructed picture can be stored in the reference picture buffer 270 and can be used for inter-frame prediction.

In HEVC, in order to encode a picture efficiently, encoding can be performed in a Coding Unit (hereinafter referred to as a 'CU').

Figure 3:
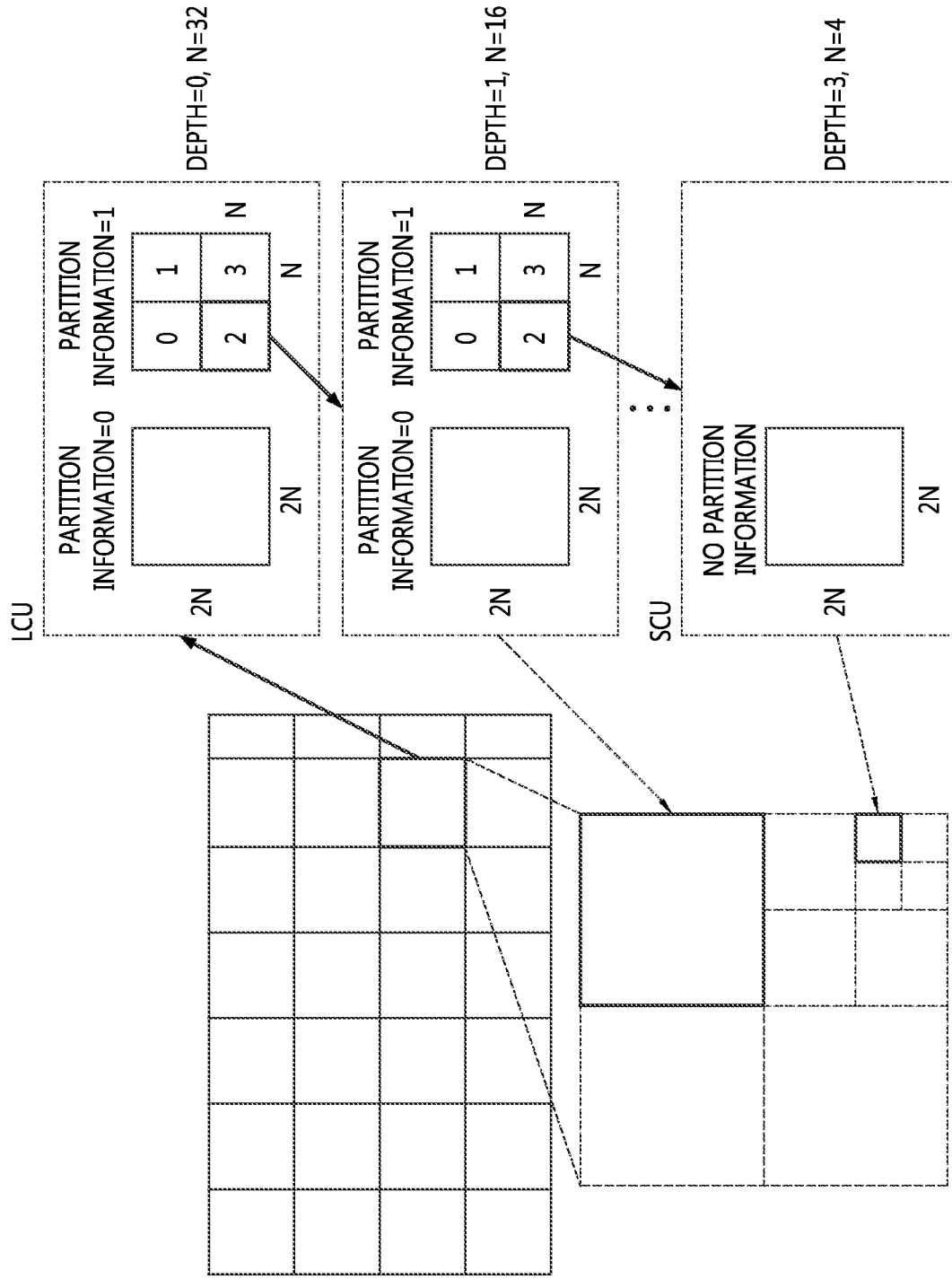
FIG. 3 shows a brief example of a method of partitioning a CU within an LCU when encoding a picture.

FIG. 3 shows a brief example of a method of partitioning a CU within a Largest Coding Unit (hereinafter referred to as an 'LCU') when encoding a picture.

A picture inputted to the encoding apparatus is sequentially partitioned per LCU as in FIG. 3, and a partition structure can be determined in the LCU.

The partition structure means a distribution of CUs for efficiently encoding a picture within an LCU. The distribution of the CUs can be specified by determining whether or not each CU will be partitioned into four CU the size of which has been reduced by half horizontally and vertically. Likewise, the partitioned CU can be recursively partitioned into four CUs the size of which has been reduced by half horizontally and vertically.

Here, the partition of the CU may be performed up to a predetermined depth. Information about the depth indicates the size of a CU, and the information is stored in all the CUs. The depth of an LCU that is a basis is 0, and the depth of a Smallest Coding Unit (hereinafter referred to as an 'SCU') is a predetermined maximum depth.

The depth of a CU is increased by 1 whenever partition is performed by half from an LCU horizontally and vertically. A CU on which partition has not been performed in each depth has a 2N×2N size. If partition is performed on a CU, the CU having a 2N×2N size before the partition is partitioned into four CUs each having an N×N size.

The size of a CU is reduced to half whenever the depth of the CU is increased by 1. FIG. 3 shows an example in which the size of an LCU having a minimum depth of 0 is a 64×64 pixel and the size of an SCU having a maximum depth of 3 is an 8×8 pixel.

In the example of FIG. 3, the CU (LCU) of the 64×64 pixel has a depth of 0, the CU of a 32×32 pixel has a depth of 1, the CU of a 16×16 pixel has a depth of 2, and the CU (SCU) of the 8×8 pixel has a depth of 3.

Furthermore, information about whether or not a CU will be partitioned is represented by 1-bit partition information for each CU. The partition information is included in all CUs other than an SCU. If a CU is not partitioned, a value of the partition information can be set to 0. If a CU is partitioned, a value of the partition information can be set to 1.

A Prediction Unit (hereinafter referred to as a 'PU') is a unit of prediction.

Figure 4:
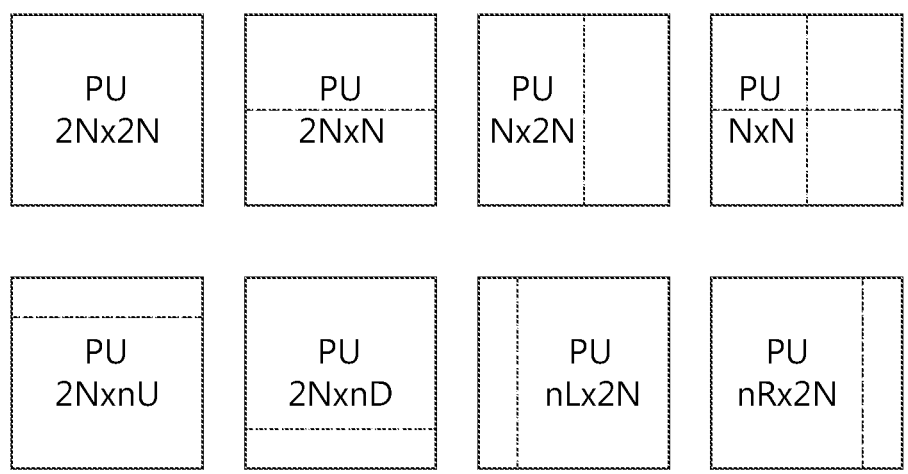
FIG. 4 schematically illustrating examples regarding the partition structures of a PU.

FIG. 4 schematically illustrating examples regarding the partition structures of a PU.

As in the example of FIG. 4, one CU can be partitioned into several PUs, and prediction can be performed on the PUs.

A Transform Unit (hereinafter referred to as a 'TU') is a basic unit used in a spatial transform and quantization process within a CU. A TU can have a rectangular or square form.

Each CU can have one or more TU blocks, and the TU block has a quad-tree structure.

Figure 5:
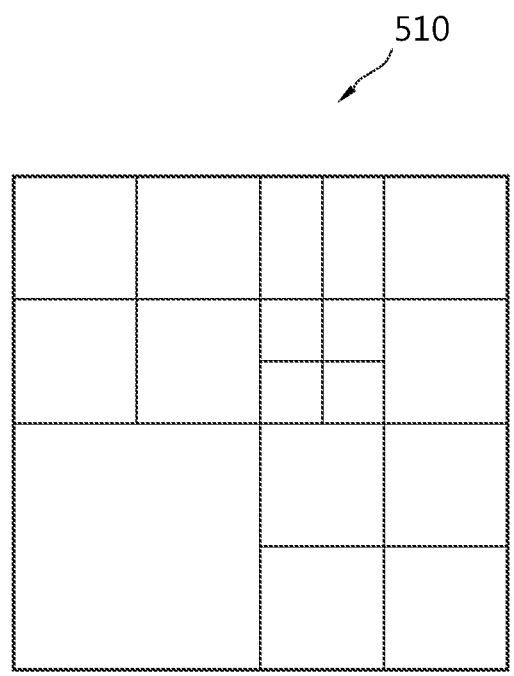
FIG. 5 shows a brief example of the partition structure of TUs within a CU.

FIG. 5 shows a brief example of the partition structure of TUs within a CU. As shown, TUs within a CU 510 can have various sizes depending on a quad-tree structure.

In intra-prediction encoding/decoding, prediction encoding according to directivity can be performed from blocks neighboring a current block.

In intra-prediction, encoding/decoding are performed using a total of 36 prediction modes including 33 angular prediction modes and 3 non-angular prediction modes.

Figure 6:
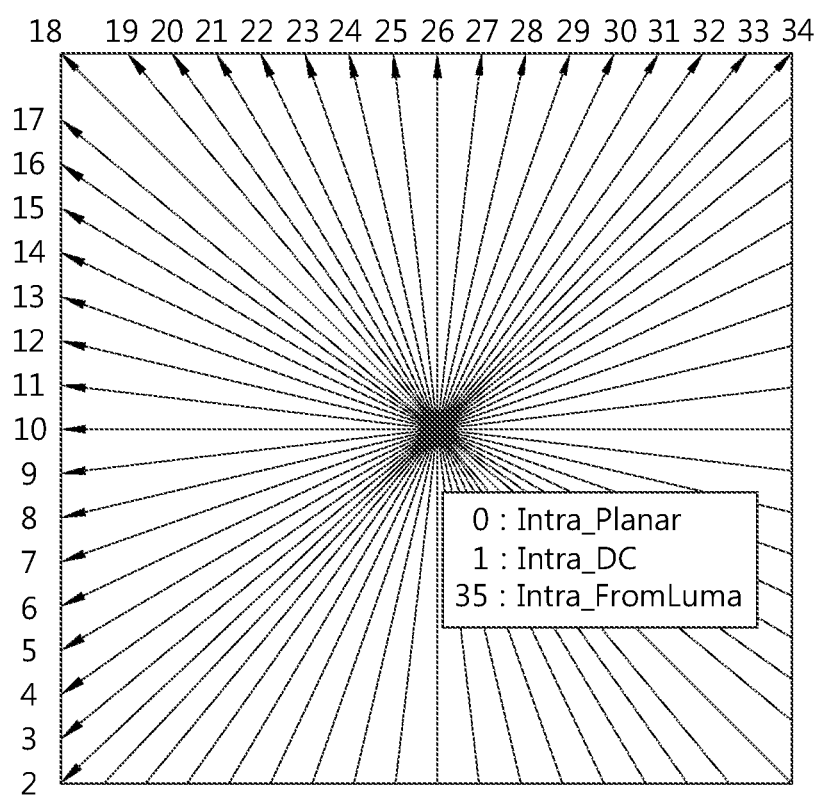
FIG. 6 schematically illustrates intra-prediction modes.

FIG. 6 schematically illustrates intra-prediction modes.

From among the 36 intra-prediction direction modes, the 3 modes without directivity include a planar mode Intra_Planar, a mean mode 'Intra_DC (DC)', and a mode 'Intra_FromLuma (LM)' in which a chroma signal is predicted from a reconstructed luma signal. In intra-prediction, all the 3 non-angular modes may be used or only some of the 3 non-angular modes may be used. For example, only the planar mode and the mean mode may be used and the LM may not be used.

Encoding for the 36 intra-prediction direction modes can be applied to each of a luma signal and a chroma signal. In the case of a luma signal, the LM can be excluded. In the case of a chroma signal, encoding on an intra-prediction direction mode can be performed according to three methods as in Table 1.

TABLE 1

| Intra-prediction direction mode for chroma signal | Intra-prediction direction mode for luma signal | | | | | |
|---|---|---|---|---|---|---|
| | 0 | 26 | 10 | 1 | X(0 <= x < 35) | |
| 0 | 34 | 0 | 0 | 0 | 0 (PLANAR) | EM |
| 1 | 26 | 34 | 26 | 26 | 26 (VER) | |
| 2 | 10 | 10 | 34 | 10 | 10 (HOR) | |
| 3 | 1 | 1 | 1 | 34 | 1 (DC) | |
| 4 | LM | LM | LM | LM | LM | LM |
| 5 | 0 | 26 | 10 | 1 | X | DM |

Table 1 includes a Derived Mode (DM) in which an intra-prediction direction mode for a luma signal is used as an intra-prediction direction mode for a chroma signal without change and an Explicit Mode (EM) in which a real intra-prediction direction mode is encoded. Intra-prediction direction modes for a chroma signal encoded in the EM include a planar mode PLANAR, a mean mode DC, a horizontal mode HOR, a vertical mode VER, and a mode located at an eighth place in a vertical direction, that is, Ver+8 or No. 34 mode. There is the LM in which a chroma signal is predicted from a reconstructed luma signal.

A mode having the best efficiency can be selected from the three mode encoding/decoding methods; DM, EM, and LM.

A method 'Intra_FromLuma' of predicting a chroma signal from a reconstructed luma signal sample may be used as a method of performing encoding/decoding by predicting a chroma signal. In this technique, a linear correlation between a chroma signal and a luma signal is used. Here, an example of the used linear correlation is illustrated in Equation 1.

$$\text{Pred}_c[x,y] = \alpha \cdot \text{Rec}_L'[x,y] + \beta \qquad \text{<Equation 1>}$$

Figure 7:
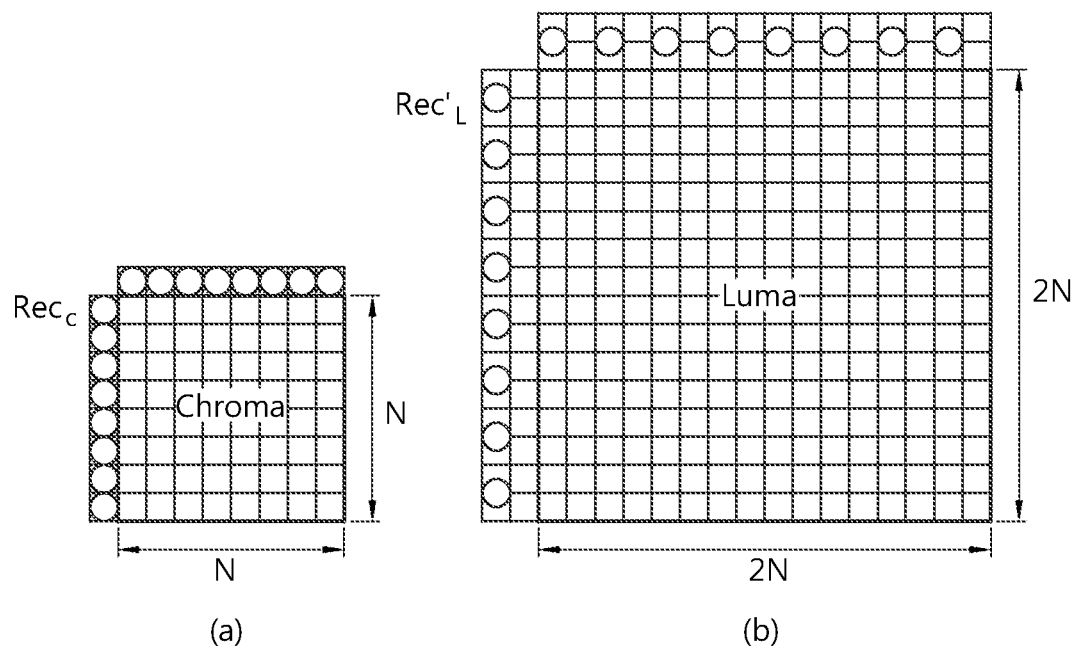
FIG. 7 is a diagram schematically illustrating the relationship of Equation 1.

FIG. 7 is a diagram schematically illustrating the relationship of Equation 1.

$\text{Pred}_c[x,y]$ of Equation 1 indicates a predicted value of a chroma signal in FIG. 7, and $\text{Rec}_L[x,y]$ indicates a value calculated from a luma signal according to Equation 2 in order to satisfy a 4:2:0 sampling ratio of a chroma signal.

$$\text{Rec}_L'[x,y] = (\text{Rec}_L[2x,2y] + \text{Rec}_L[2x,2y+1]) >> 1 \qquad \text{<Equation 2>}$$

In Equation 2, a α value and a β value indicate weight a and a compensation value between a down-sampled luma signal and a down-sampled chroma signal.

A residual picture, that is, a difference with the original picture, can be generated using a prediction picture for the chroma signal obtained according to Equations 1 and 2.

The residual picture is subject to frequency domain transform, quantization, and entropy encoding. Furthermore, the frequency domain transform can include integer transform, integer Discrete Cosine Transform (DCT), integer Discrete Sine Transform (DST), or intra-prediction mode-dependent DCT/DST.

As described above, the residual pictures of the original picture and the prediction picture can be subject to frequency domain transform and quantization and the subject to entropy encoding. Here, in order to increase entropy encoding efficiency, coefficients having a 2-D form quantized picture can be rearranged into coefficients having a 1-D form.

In a prior art, a zigzag scanning method is used. In contrast, in this specification, an up-right diagonal scanning method other than the zigzag scanning method can be used as a scanning method for quantization coefficients. Furthermore, frequency domain transform can include integer transform, integer DCT, integer DST, or intra-prediction mode-dependent DCT/DST.

Quantization coefficients for a specific block can be grouped into 4×4 subblocks and then encoded/decoded.

Figure 8:
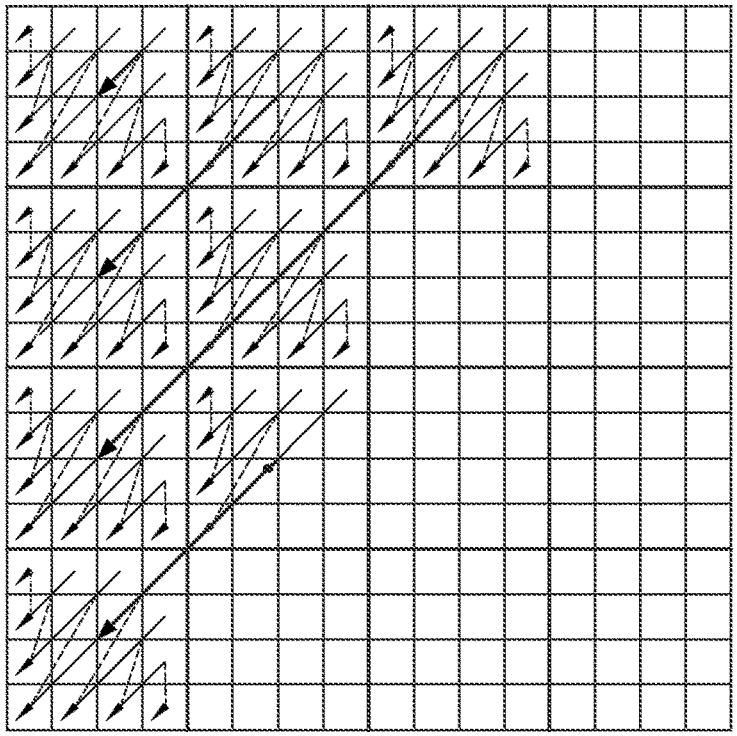
FIG. 8 is a diagram illustrating an example of up-right diagonal scanning for important group flags and transform coefficients.

FIG. 8 is a diagram illustrating an example of an up-right diagonal scanning method for important group flags and transform coefficients.

FIG. 8 shows an example in which a 16×16 block is partitioned into 16 4×4 subblocks and the 16 4×4 subblocks are encoded.

FIG. 8(a) shows a basic scanning method, and FIG. 8(b) schematically shows a case where quantization coefficients are actually scanned and the results of the scanning.

In a decoding process, whether or not a transform coefficient is present in each subblock can be checked through significant_coeff_group_flag (sigGrpFlag) parsed from a bit stream. When a value of significant_coeff_group_flag is 1, it means that any one quantized transform coefficient is present in a corresponding 4×4 subblock. In contrast, when a value of significant_coeff_group_flag is 0, it means that a quantized transform coefficient is not present in a corresponding 4×4 subblock. Up-right scanning is basically applied to a scanning direction for the 4×4 subblock in FIG. 8 and a scanning direction for significant_coeff_group_flag.

FIG. 8 shows an example in which an up-right diagonal scanning method is applied, but a scanning method for quantization coefficients includes an up-right diagonal scanning method, a horizontal scanning method, and a vertical scanning method.

In inter-prediction, the up-right diagonal scanning method can be basically used. In intra-prediction, the up-right diagonal scanning method, the horizontal scanning method, and the vertical scanning method can be selectively used.

In intra-prediction, a different scanning direction can be selected depending on an intra-prediction direction and may be applied to both a luma signal and a chroma signal.

Table 2 illustrates an example of a method of determining a scanning direction depending on a frame prediction direction.

TABLE 2

| IntraPredModeValue | log2TrafoSize − 2 | | | |
|---|---|---|---|---|
| | 0 | 1 | 2 | 3 |
| 0 | 0 | 0 | 0 | 0 |
| 1 | 0 | 0 | 0 | 0 |
| 2-5 | 0 | 0 | 0 | 0 |
| 6-14 | 2 | 2 | 0 | 0 |
| 15-21 | 0 | 0 | 0 | 0 |
| 22-30 | 1 | 1 | 0 | 0 |
| 31-35 | 0 | 0 | 0 | 0 |

In Table 2, 'IntraPredModeValue' indicates an intra-prediction direction. The intra-prediction direction corresponds to an IntraPredMode value in a luma signal and corresponds to an IntraPredModeC value in a chroma signal. Furthermore, 'log 2TrafoSize' indicates that the size of a current transform block is represented using 'log'.

For example, when IntraPredModeValue is 1, it means an 'Intra_DC' mode. When 'log 2TrafoSize-2' is 1, it means an 8×8 block.

Furthermore, in Table 2, numbers 0, 1, or 2 determined by IntraPredModeValue and log 2TrafoSize specifies a scanning direction. For example, in Table 2, 2 indicates up-right diagonal scanning, 1 indicates horizontal scanning, and 2 indicates vertical scanning.

Figure 9:
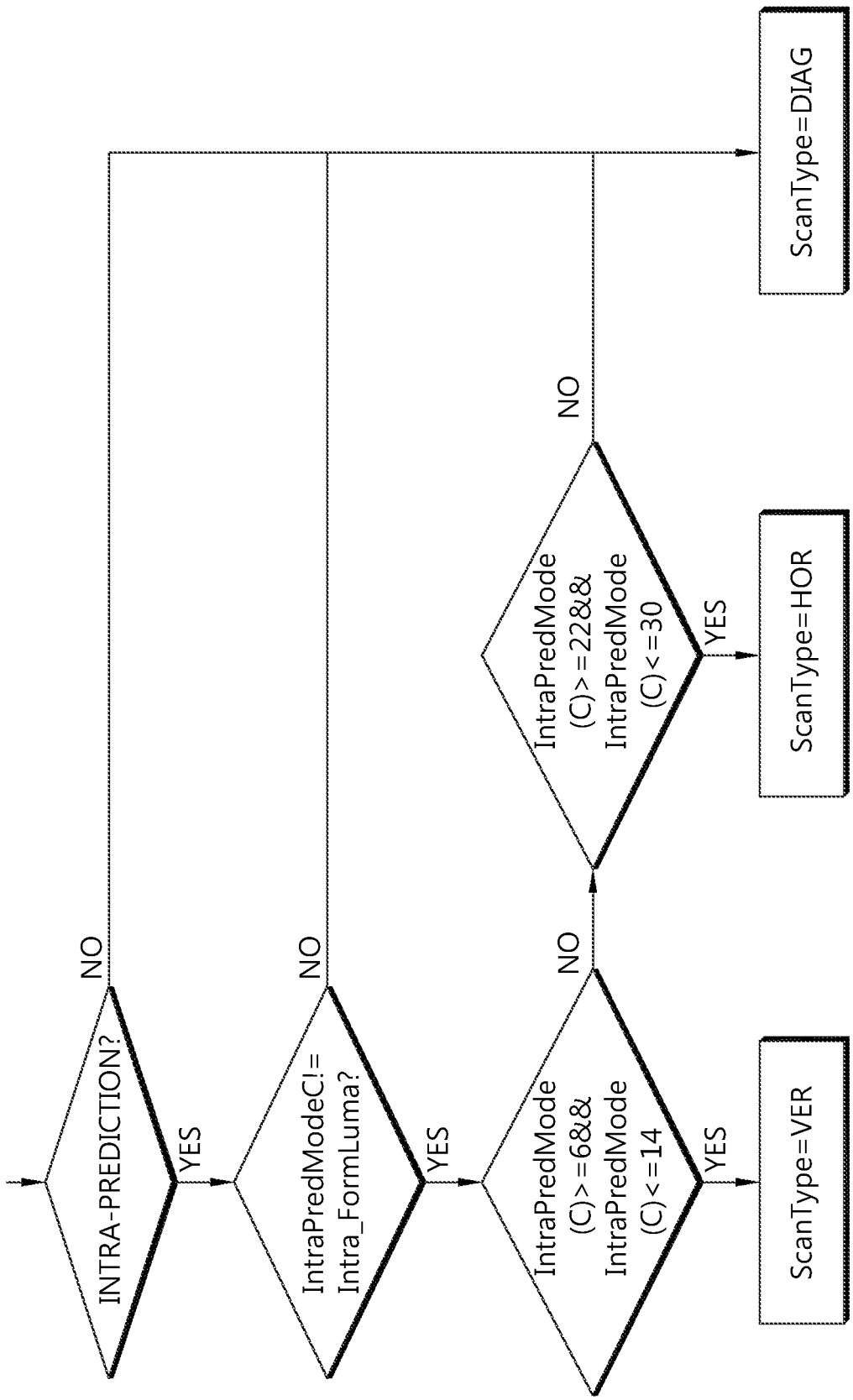
FIG. 9 is a flowchart illustrating an example of a method of determining a scanning direction according to a frame prediction direction.

FIG. 9 is a flowchart illustrating an example of a method of determining a scanning direction according to a frame prediction direction.

In FIG. 9, IntraPredMode indicates an intra-prediction direction mode for a luma signal, and IntraPredModeC indicates an intra-prediction direction mode for a chroma signal. IntraPredMode(C) may be a luma signal or a chroma signal depending on the component of the signal. ScanType indicates a residual signal scanning direction and includes up-right (DIAG; Up-right=0) scanning, horizontal (HOR; Horizontal=1) scanning, and vertical (VER; Vertical=2) scanning.

The example of FIG. 9 can be performed in an encoder apparatus and a decoder apparatus. Furthermore, the example of FIG. 9 may be performed within a specific module within the encoder apparatus and the decoder apparatus.

Figure 10:
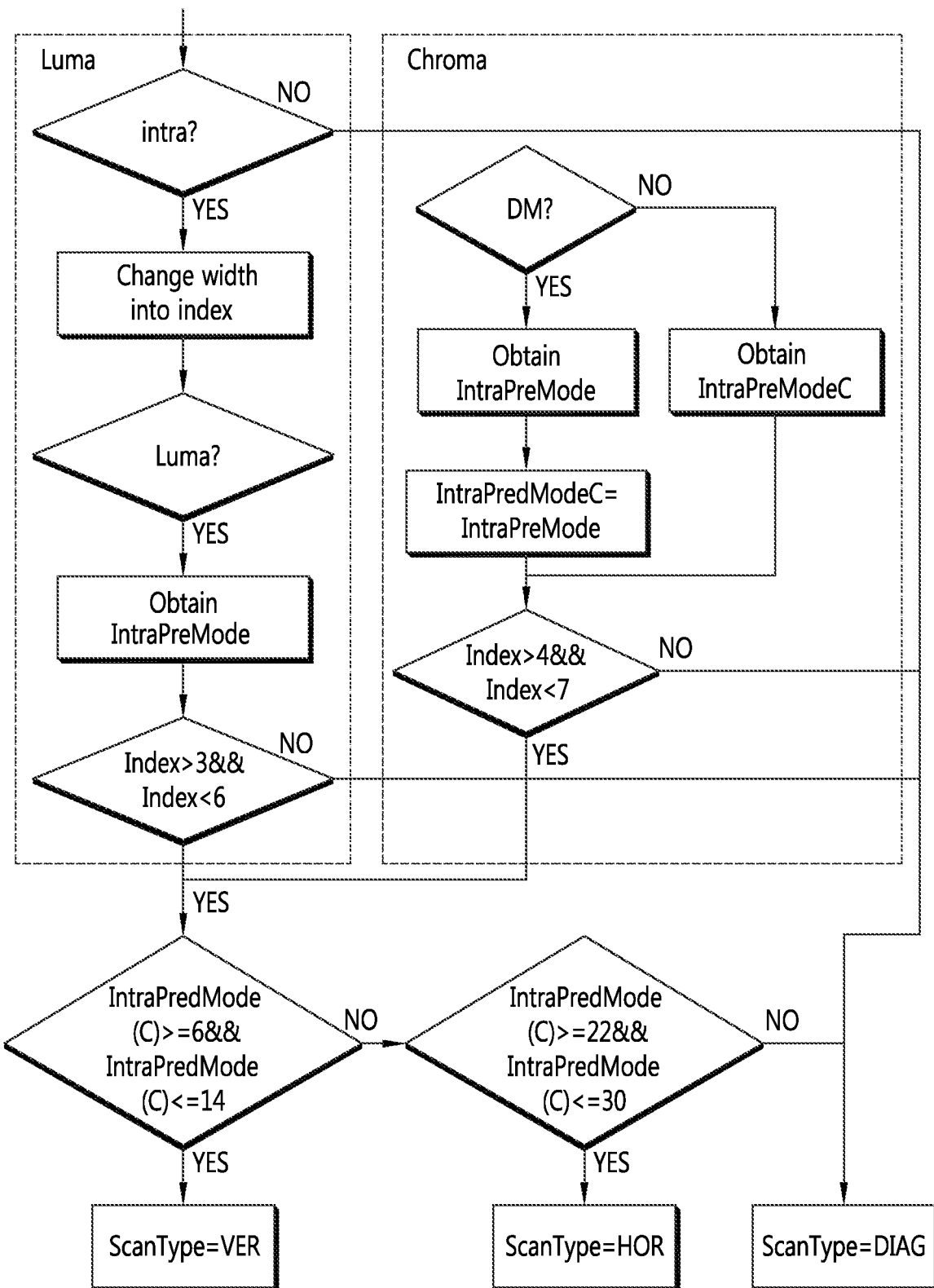
FIG. 10 is a flowchart schematically illustrating another example of a method of determining a scanning direction according to a frame prediction direction.

FIG. 10 is a flowchart schematically illustrating another example of a method of determining a scanning direction according to a frame prediction direction.

In the example of FIG. 10, a scanning method for a luma signal and a scanning method for a chroma signal are differently represented. In FIG. 10, an index is an indicator indicating the size of transform, and an index value according to each transform size can be calculated as follows.

If a transform size is 64×64, an index is 1. If a transform size is 32×32, an index is 2. If a transform size is 16×16, an index is 3. If a transform size is 8×8, an index is 4. If a transform size is 4×4, an index is 5. If a transform size is 2×2, an index is 6.

From FIG. 10, it can be seen that scanning according to an intra-prediction direction is applied to an 8×8 transform size and a 4×4 transform size in the case of a luma signal and is applied to a 4×4 transform size, that is, the smallest size, in the case of a chroma signal. Furthermore, if scanning according to an intra-prediction direction is applied, up-right (DIAG; Up-right=0) scanning can be applied.

In order to encode quantization coefficients in intra-prediction, a scanning direction obtained from Table 2 can be used as a scanning direction for a 4×4 subblock and a scanning direction for significant_coeff_group_flag as in FIG. 8.

As described above, in an encoding process, a residual picture for the original picture and the prediction picture are subject to frequency domain transform and quantization and then subject to entropy encoding. Here, in order to increase encoding efficiency due to the frequency domain transform, integer transform, integer DCT, integer DST, or intra-prediction mode-dependent DCT/DST can be applied selectively and adaptively depending on the size of a block.

Furthermore, in a decoding process, a residual picture is subject to entropy decoding, dequantization, and frequency domain inverse transform. Here, integer inverse transform, integer inverse DCT, integer inverse DST, or intra-prediction mode-dependent DCT/DST can be applied selectively and adaptively depending on the size of a block.

Figure 11:
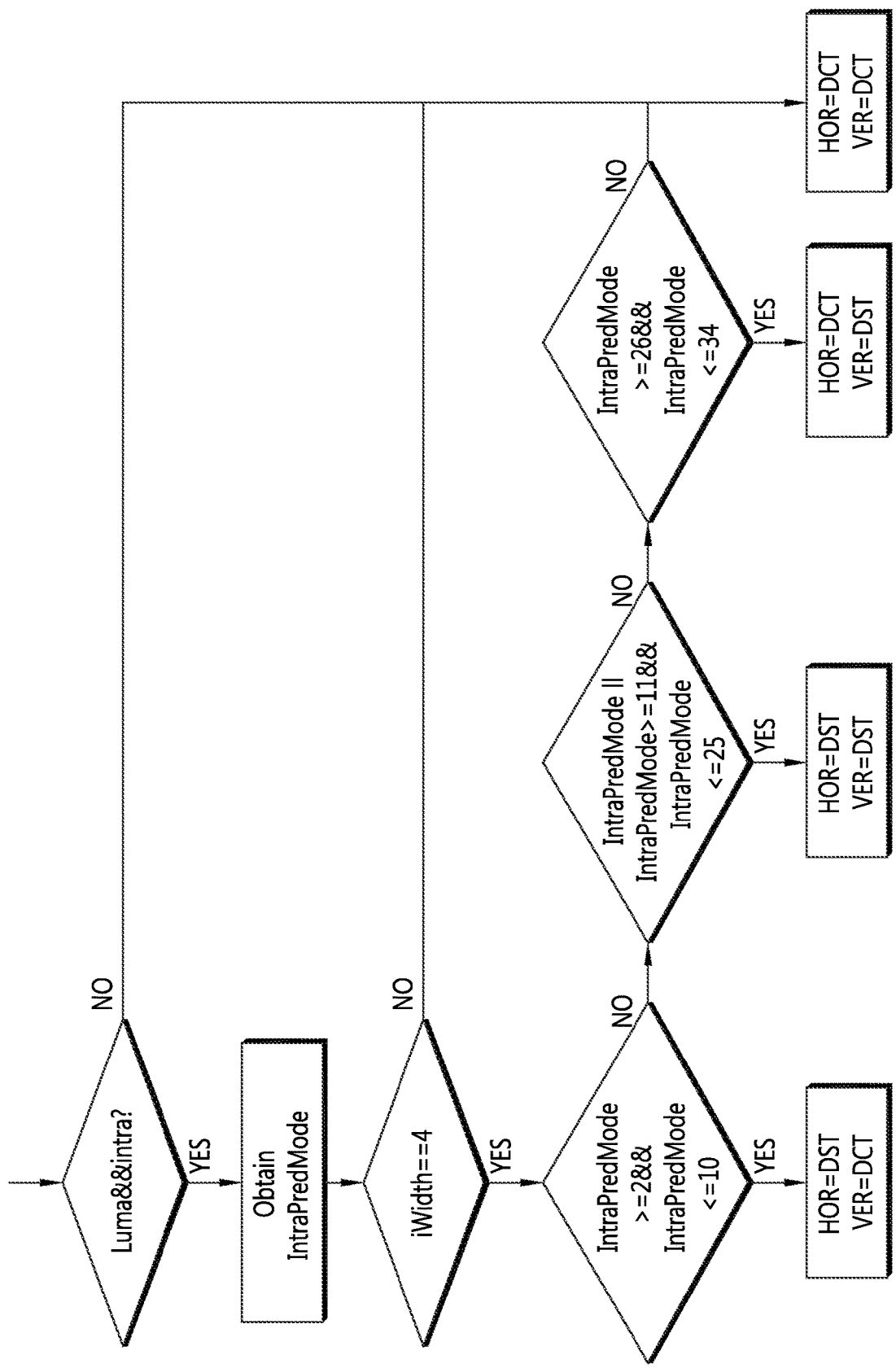
FIG. 11 is a flowchart illustrating an example of a method of selecting a frequency transform method for a residual picture.

FIG. 11 is a flowchart illustrating an example of a method of selecting a frequency transform method for a residual picture.

First, if a current block has been subjected to intra-frame encoding and is not a block of a luma signal, integer transform or integer DCT is performed in a frequency transform method for the residual pictures of the luma signal and the chroma signal of the current block.

If not (i.e., the current block has been subjected to intra-frame encoding and is a block of a luma signal), an intra-prediction direction mode 'IntraPredMode' for the luma signal of the current block is obtained.

Next, it is checked whether or not the current block is a block having a 4×4 size (iWidth==4). If, as a result of the check, the current block is not a block having a 4×4 size (iWidth==4), integer transform or integer DCT is performed in a frequency transform method for the residual pictures of the luma signal and the chroma signal of the current block.

If, as a result of the check, the current block is a block having a 4×4 size (iWidth==4), an intra-prediction direction mode of the current block is checked.

If, as a result of the check, the intra-prediction direction mode of the current block is 2 or more and 10 or less, integer DST is performed in a frequency transform method for the luma signal of the current block in a horizontal direction and integer DCT is performed in a frequency transform method for the luma signal of the current block in a vertical direction.

Integer DCT is performed in a frequency transform method for the chroma signal of the current block in both horizontal and vertical directions.

If, as a result of the check, the intra-prediction direction mode of the current block is 0 or is 11 or more and 25 or less, integer DST is performed in a frequency transform method for the luma signal of the current block in both horizontal and vertical directions.

Integer DCT is performed in a frequency transform method for the chroma signal of the current block in both horizontal and vertical directions.

If, as a result of the check, the intra-prediction direction mode of the current block is 26 or more and 34 or less, integer DCT is performed in a horizontal direction and integer DST is performed in a vertical direction in a frequency transform method for the luma signal of the current block.

Integer DCT is performed in both horizontal and vertical directions in a frequency transform method for the chroma signal of the current block.

If not, integer DCT is performed in both horizontal and vertical directions in a frequency transform method for the residual pictures of the luma signal and the chroma signal of the current block.

In FIG. 11, iWidth is an indicator indicating the size of transform, and a value of iWidth according to each transform size can be calculated as follows.

If a transform size is 64×64, iWidth=64. If a transform size is 32×32, iWidth=32. If a transform size is 16×16, iWidth=16. If a transform size is 8×8, iWidth=8. If a transform size is 4×4, iWidth=4. If a transform size is 2×2, iWidth=2.

In relation to FIG. 11, a transform process for scaled transform coefficients is as follows.

<Transform Process for Scaled Transform Coefficients>

In this case, the input is as follows.

The width of a current transform block: nW

The height of the current transform block: nH

An array of scaled transform coefficients having an element dij: (nW×nH) array d An index for the luma signal and the chroma signal of a current block: cIdx If cIdx is 0, it means a luma signal, and if cIdx is 1 or cIdx is 2, it means a chroma signal. Furthermore, if cIdx is 1, it means Cb in a chroma signal, and if cIdx is 2, it means Cr in a chroma signal.

In this case, the output is as follows.

An array for a residual signal obtained by inversely transforming the scaled transform coefficients: (nW×nH) array r If an encoding mode 'PredMode' for the current block is an intra-prediction mode 'Intra', a value of Log 2(nW*nH) is 4, and a value of cIdx is 0, parameters horizTrType and vertTrType according to Table 3 are used depending on intra-prediction direction modes for a luma signal. If not, the parameters horizTrType and vertTrType are set to 0.

TABLE 3

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |
| IntraPredMode | 18 | 19 | 20 | 21 | 22 | 23 | 24 | 25 | 26 | 27 | 28 | 29 | 30 | 31 | 32 | 33 | 34 | |
| vertTrType | 1 | 1 | 1 | 1 | 1 | 1 | 1 | 1 | 1 | 1 | 1 | 1 | 1 | 1 | 1 | 1 | 1 | |
| horizTrType | 1 | 1 | 1 | 1 | 1 | 1 | 1 | 1 | 0 | 0 | 0 | 0 | 0 | 0 | 0 | 0 | 0 | |

An inverse transform process is performed on the scaled transform coefficients using the parameters horizTrType and vertTrType. First, the sizes nW and nH and scaled transform coefficients array 'nW×nH array d' of the current block and the parameter horizTrType are received, 1-D inverse transform is performed in a horizontal direction using them, and an array 'nW×nH array e' is outputted.

Next, the array 'nW×nH array e' is received, and an array 'nW×nH array g' is derived as in Equation 3.

$$g_{ij} = \text{Clip3}(-32768, 32767, (e_{ij}+64) \gg 7)$$ <Equation 3>

Next, the sizes nW and nH and array 'nW×nH array g' of the current block and the parameter vertTrType are received, and 1-D inverse transform is performed in a vertical direction using them.

Next, an array 'nW×nH array r' for the residual signals is set based on cIdx as in Equation 4.

$$r_{ij} = (f_{ij} + (1 \ll (\text{shift}-1))) \gg \text{shift}$$ <Equation 4>

In Equation 4, 'shift'=20−BitDepth$_Y$ when cIdx is 0. 'shift'=20−BitDepth$_C$ when cIdx is not 0. BitDepth indicates the number of bits (e.g., 8 bits) for a current picture.

As described above, a method (Intra_FromLuma) of predicting a chroma signal from a reconstructed luma signal sample may be used as a method of predicting a chroma signal.

A residual signal (an error signal: residual) for a chroma component encoded using the Intra_FromLuma method is basically scanned in an up-right (Up-right=0) direction and then encoded because there is no intra-frame direction mode.

However, since the Intra_FromLuma method is based on similarity between a luma signal and a chroma signal, there is a good possibility that a residual signal for the chroma signal obtained by the Intra_FromLuma method may have a similar characteristic to a residual signal for the luma signal. Accordingly, encoding efficiency for the residual signal of the chroma signal can be improved using this characteristic.

Furthermore, encoding efficiency can be improved by differently applying integer DCT and integer DST to a 4×4 luma signal block in horizontal and vertical directions depending on an intra-prediction direction mode of a luma signal. In contrast, only integer DCT is performed on a conventional 4×4 chroma signal block.

There is a possibility that the residual picture of a chroma signal may have a similar characteristic to the residual picture of a luma signal. Accordingly, in order to improve encoding efficiency, a selective frequency transform method based on an intra-prediction direction mode applied to the residual picture of the luma signal can also be applied to the residual picture of the chroma signal.

Furthermore, the method (Intra_FromLuma) of predicting a chroma signal from a reconstructed luma signal sample, that is, a method of predict a chroma signal, is based on similarity between the luma signal and the chroma signal. Accordingly, there is a good possibility that a residual signal for the chroma signal obtained by the Intra_FromLuma method has a similar characteristic to a residual signal for the luma signal. As a result, if a selective frequency transform method is applied to the residual signal of the chroma signal based on the above characteristic, encoding efficiency can be improved.

As described above, the Intra_FromLuma method is an intra-prediction method using similarity between a luma signal and a chroma signal. A scanning direction for the residual signal of a chroma signal can be derived from an intra-prediction direction for a luma signal based on the similarity between the luma signal and the chroma signal.

In this specification, a method and apparatus for deriving a scanning direction for a chroma signal are described in more detail below.

Figure 12:
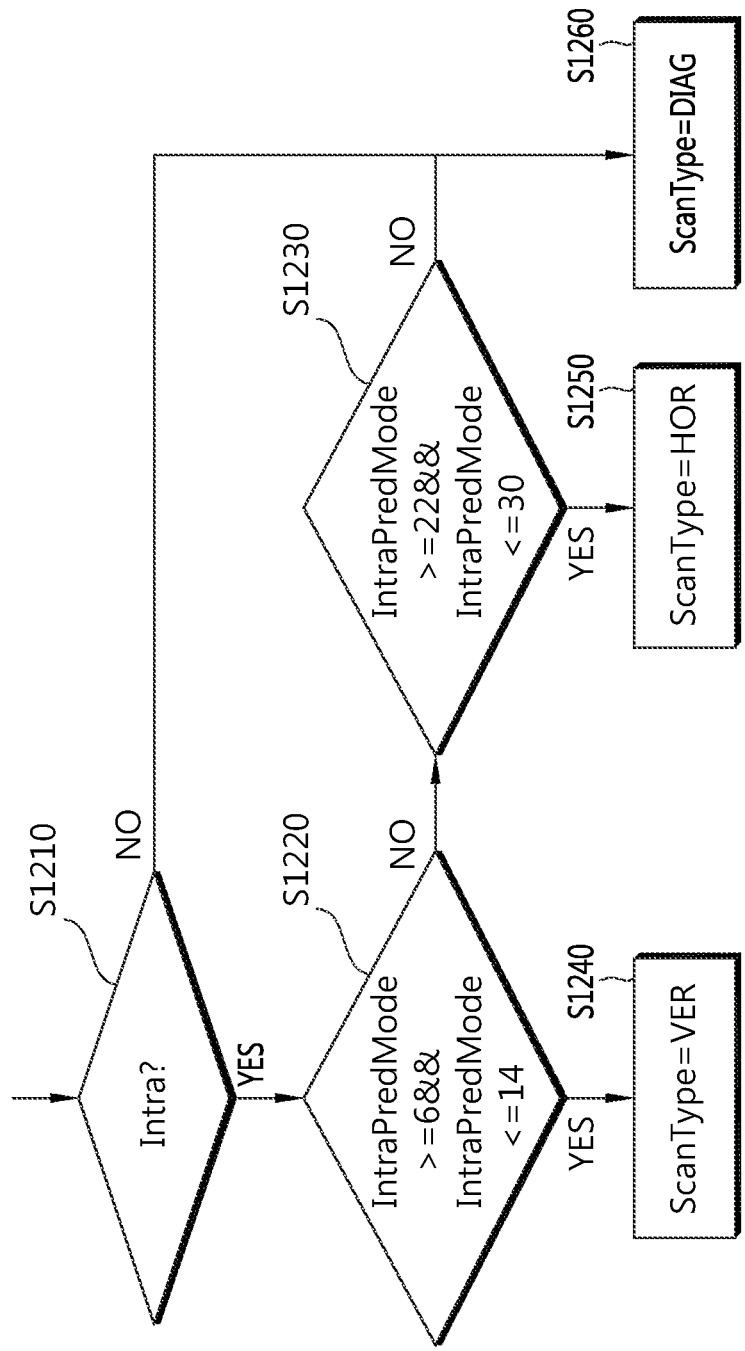
FIG. 12 is a flowchart illustrating an example of a method of deriving a scanning direction for a chroma signal according to the present embodiment.

[Embodiment 1] A Method and Apparatus for Deriving a Scanning Direction for a Chroma Signal Based on an Intra-Prediction Direction Mode of a Luma Signal FIG. 12 is a flowchart illustrating an example of a method of deriving a scanning direction for a chroma signal according to the present embodiment.

In the example of FIG. 12, the derivation of a scanning direction for a chroma signal can be determined by an intra-prediction direction mode of a luma signal. In other words, a scanning direction for a luma signal can be applied to a chroma signal without change. Accordingly, there is an advantage in that complexity is reduced because it is not necessary to derive calculation for deriving a scanning direction for a chroma signal.

The operation of FIG. 12 can be performed in the encoding apparatus of FIG. 1 and the decoding apparatus of FIG. 2.

Referring to FIG. 12, whether or not the luma component of a current block has been subjected to intra-prediction is determined at step S1210. If, as a result of the determination, it is determined that the current block has not been subjected to intra-prediction (i.e., subjected to inter-prediction), up-right diagonal scanning is performed on the chroma component and the luma component of the current block at step S1260. That is, up-right diagonal scanning is performed on both a scan type for the luma component of the current block and a scan type for the chroma component of the current block.

If, as a result of the determination, it is determined that the luma component of the current block has been subjected to intra-prediction, whether or not an intra-prediction mode for the luma component of the current block is 6 or more and 14 or less is determined at step S1220. That is, whether an intra-prediction mode for the luma component of the current block is an intra-prediction mode in a horizontal direction or an intra-prediction mode in a direction close to horizontality is determined at step S1220.

If, as a result of the determination, it is determined that the intra-prediction mode for the luma component of the current block is 6 or more and 14 or less, vertical scanning is performed on the luma component and the chroma component of the current block at step S1240. That is, vertical scanning is performed on both a scan type for the luma component of the current block and a scan type for the chroma component of the current block.

If the luma component of the current block has been subjected to intra-prediction, but it is determined that the intra-prediction mode for the luma component of the current block is not 6 or more and 14 or less, whether or not an intra-prediction mode for the luma component of the current block is 22 or more and 30 or less is determined at step S1230. That is, whether the intra-prediction mode for the luma component of the current block is an intra-prediction mode in a vertical direction or an intra-prediction mode in a direction close to verticality is determined.

If, as a result of the determination, it is determined that the intra-prediction mode for the luma component of the current block is 22 or more and 30 or less, horizontal scanning is performed on the luma component and the chroma component of the current block at step S1250. That is, horizontal scanning is performed on both a scan type for the luma component of the current block and a scan type for the chroma component of the current block.

If the luma component of the current block has been subjected to intra-prediction, but it is determined that the intra-prediction mode for the luma component of the current block is not 6 or more and 14 or less and is not 22 or more and 30 or less, up-right diagonal scanning is performed on the luma component and the chroma component of the current block at step S1260.

Figure 13:
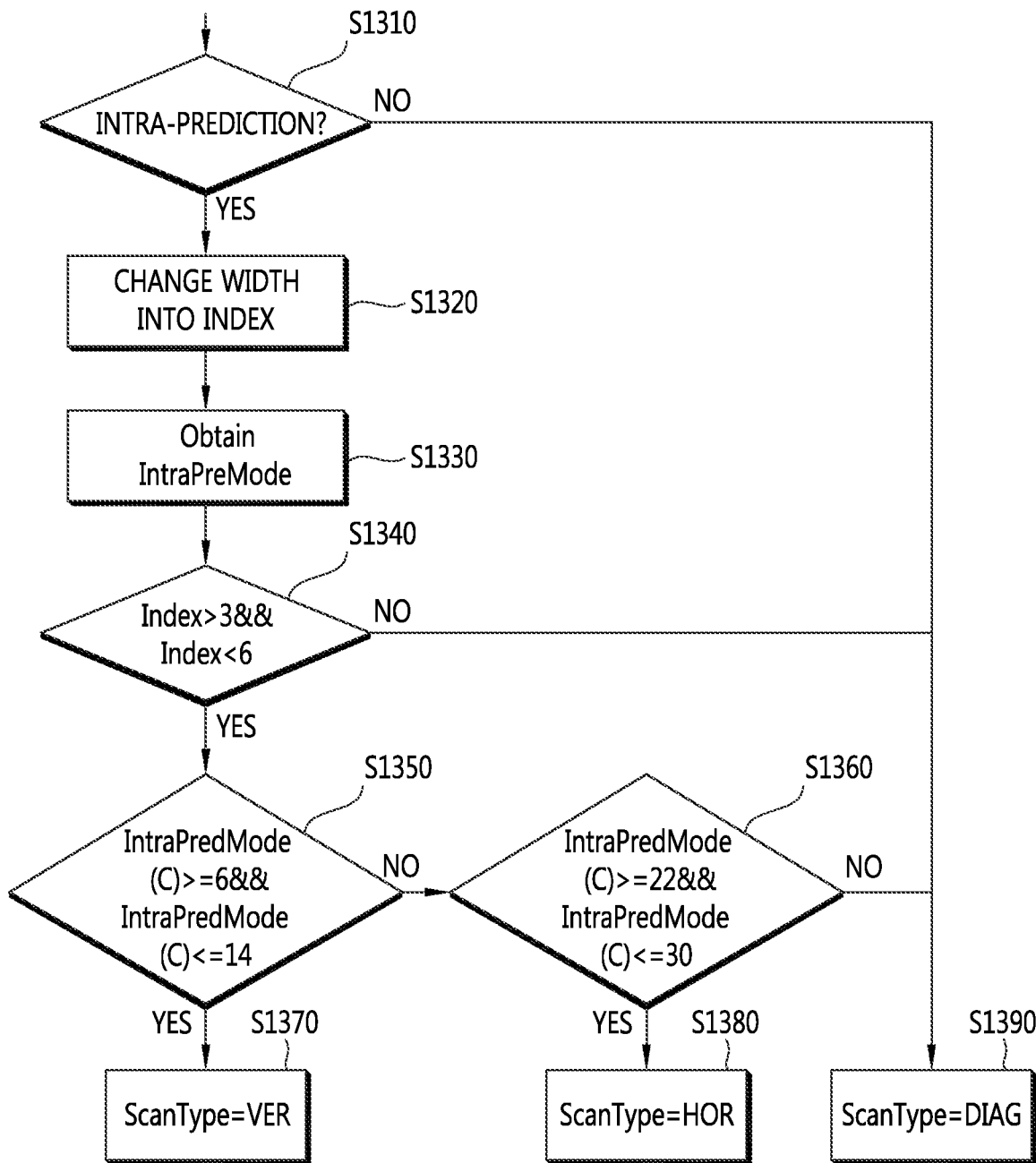
FIG. 13 is a flowchart illustrating another example of a method of deriving a scanning direction for a chroma signal according to the present embodiment.

FIG. 13 is a flowchart illustrating another example of a method of deriving a scanning direction for a chroma signal according to the present embodiment. The example of FIG. 13 can have an advantage in that a scanning method for a luma signal and a scanning method for a chroma signal are unified.

The operation of FIG. 13 can be performed in the encoding apparatus of FIG. 1 and the decoding apparatus of FIG. 2.

Referring to FIG. 13, first, whether or not a current block has been subjected to intra-prediction is determined at step S1310.

If, as a result of the determination, it is determined that a current block has not been subjected to intra-prediction, up-right diagonal scanning is performed on the luma signal and the chroma signal of the current block at step S1390.

If, as a result of the determination, it is determined that the current block has been subjected to intra-prediction, the size of the current block is changed into an index at step S1320. For example, an index to specify the size of the current block can be set.

Next, information about the intra-prediction of the current block mode, that is, IntraPredMode, can be obtained at step S1330. IntraPredMode, that is, information indicative of an intra-prediction mode for the current block, can be obtained based on FIG. 6.

Whether or not the index set for the current block at step S1320 is greater than 3 and smaller than 6 is determined at step S1340. If, as a result of the determination, it is determined that the index for the current block is not greater than 3 and smaller than 6, up-right diagonal scanning is performed on the luma signal and the chroma signal of the current block at step S1390.

If, as a result of the determination, it is determined that the index for the current block is greater than 3 and smaller than 6, whether or not an intra-prediction mode for the chroma signal of the current block is 6 or more and 14 or less is determined at step S1350. If, as a result of the determination, it is determined that the intra-prediction mode for the chroma signal of the current block is 6 or more and 14 or less, vertical scanning is performed on the chroma signal of the current block at step S1370.

If, as a result of the determination, it is determined that the intra-prediction mode for the chroma signal of the current block is not 6 or more and 14 or less, whether or not the intra-prediction mode for the chroma signal of the current block is 22 or more and 30 or less is determined at step S1360. If, as a result of the determination, it is determined that the intra-prediction mode for the chroma signal of the current block is 22 or more and 30 or less, horizontal scanning is performed on the chroma signal of the current block at step S1380.

If, as a result of the determination, it is determined that the intra-prediction mode for the chroma signal of the current block is not 6 or more and 14 or less and is not 22 or more and 30 or less, up-right diagonal scanning is performed on the chroma signal of the current block at step S1390.

Unlike in the example of FIG. 12, in the example of FIG. 13, an intra-prediction mode for the chroma signal of the current block is determined and a scan type is determined based on a result of the determination. Like in the example of FIG. 12, however, a scanning method for a chroma signal and a luma signal is determined as the same method.

In other words, the flowchart of FIG. 13 can be equally applied to the scanning of a luma signal. The reason why IntraPredMode(C) is indicated using parentheses at steps S1350 and S1360 is that an intra-prediction mode for the luma signal can be specified by IntraPredMode and applied and an intra-prediction mode for the chroma signal can be specified by IntraPredModeC and applied.

Accordingly, the flowchart of FIG. 13 can be equally applied to a luma signal and a chroma signal, and a scanning type for the luma signal and a scanning type for the chroma signal can be determined as the same method. Here, the scanning type is any one of vertical scanning, horizontal scanning, and up-right diagonal scanning.

Table 4 is obtained by incorporating the examples of FIGS. 12 and 13 into a syntax structure for a Transform Unit (hereinafter referred to as a 'TU').

Table 4 shows an example of the TU syntax according to the present embodiment 1.

TABLE 4

| | Descriptor |
|---|---|
| transform_unit( x0, y0, xC, yC, log2TrafoWidth, log2TrafoHeight, trafoDepth, blkIdx ) { ...   log2TrafoSize = ( ( log2TrafoWidth + log2TrafoHeight ) >> 1 )   log2TrafoSizeC = ( ( log2TrafoSize == Log2MinTrafoSizeC ) ?     log2TrafoSize : log2TrafoSize − 1 )   if( PredMode == MODE_INTRA ) {     scanIdx = ScanType[ log2TrafoSize − 2 ][ IntraPredMode ]     scanIdxC =scanIdx   } else {     scanIdx = 0     scanIdxC = 0   } ... | |

In Table 4, transform_unit indicates order of bit streams for one TU block. log 2TrafoSize indicates a result of right shift operation for the sum of log 2TrafoWidth and log 2TrafoHeight and indicates the size of a TU block for a luma signal. log 2TrafoSizeC indicates the size of a TU block for a chroma signal.

PredMode indicates an encoding mode for a current block. PredMode is 'Intra' in the case of intra-frame encoding and is 'Inter' in the case of inter-frame encoding. scanIdx indicates information about a scanning direction for the luma signal of a current TU block and includes an up-right direction DIAG (Up-right=0), a horizontal direction HOR (Horizontal=1), and a vertical direction VER (Vertical=2).

scanIdxC indicates information about a scanning direction for the chroma signal of a current TU block and includes an up-right direction DIAG (Up-right=0), a horizontal direction HOR (Horizontal=1), and a vertical direction VER (Vertical=2).

ScanType is determined based on the table of a method of determining a scanning direction according to a frame prediction direction of Table 2.

IntraPredMode indicates information about an intra-prediction direction for a luma signal. IntraPredModeC indicates information about an intra-prediction direction for a chroma signal.

In relation to Table 4, a transform coefficient level can be parsed in a transCoeffLevel array. Here, if PredMode is Intra, a different scanning direction is applied depending on an intra-prediction direction mode. This scanning direction can be obtained from the ScanType array in Table 2.

A scanning direction for a luma signal can be used as a scanning direction for a chroma signal without change.

[Embodiment 2-1] A Method and Apparatus for Applying a Scanning Direction for a Luma Signal to a Chroma Signal without Change when an Intra-Prediction Direction Mode for the Chroma Signal is 'Intra_FromLuma'

Figure 14:
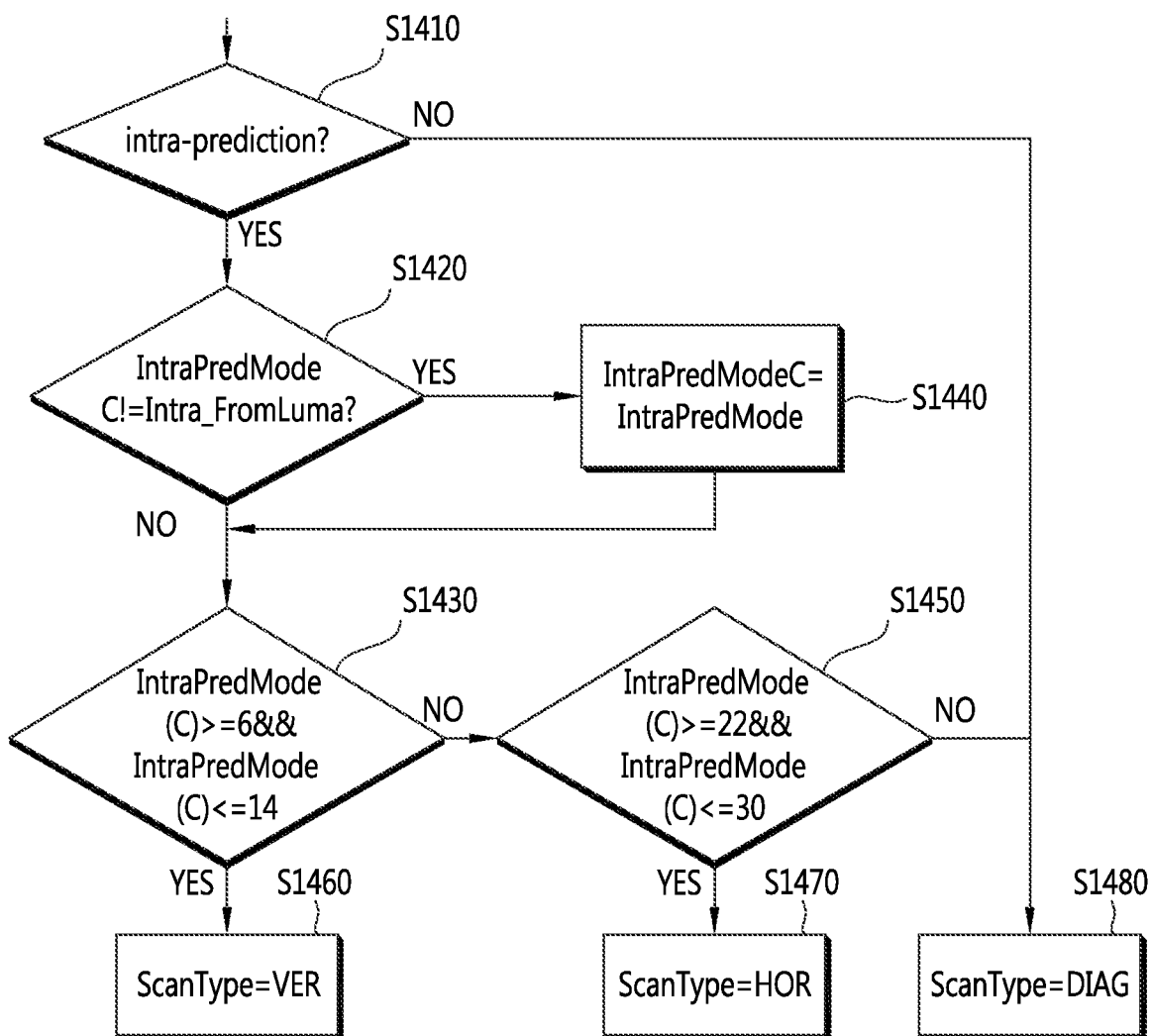
FIG. 14 is a flowchart illustrating an embodiment of a method of deriving a scanning direction for a chroma signal according to the present embodiment.

FIG. 14 is a flowchart illustrating an embodiment of a method of deriving a scanning direction for a chroma signal according to the present embodiment.

Referring to FIG. 14, whether or not an intra-prediction direction mode for the chroma signal of a current block is an intra-prediction mode is determined at step S1410. If, as a result of the determination, it is determined that an intra-prediction mode has not been applied to the current block, up-right diagonal scanning is performed on the current block at step S1480.

If, as a result of the determination, it is determined that the current block has been subjected to intra-prediction, whether or not the intra-prediction mode for the chroma signal of the current block is Intra_FromLuma is determined at step S1420. If, as a result of the determination, it is determined that the intra-prediction mode for the chroma signal of the current block is Intra_FromLuma, an intra-prediction mode for the luma signal of the current block is set as the intra-prediction mode for the chroma signal of the current block at step S1440.

In other words, if the intra-prediction mode for the chroma signal of the current block is Intra_FromLuma, a scanning direction for the chroma signal can be derived by inputting the intra-prediction direction mode of the luma signal to the intra-prediction direction mode of the chroma signal. That is, if the intra-prediction direction mode of the chroma signal is Intra_FromLuma, the scanning direction for the luma signal can be used as the scanning direction for the chroma signal.

Next, whether or not the intra-prediction mode for the chroma signal of the current block is 6 or more and 14 or less is determined at step S1430. If, as a result of the determination, it is determined that the intra-prediction mode for the chroma signal of the current block is 6 or more and 14 or less, vertical scanning is performed on the chroma signal of the current block at step S1460.

If, as a result of the determination, it is determined that the intra-prediction mode for the chroma signal of the current block is not 6 or more and 14 or less, whether or not the intra-prediction mode for the chroma signal of the current block is 22 or more and 30 or less is determined at step S1450. If, as a result of the determination, it is determined that the intra-prediction mode for the chroma signal of the current block is 22 or more and 30 or less, horizontal scanning is performed on the chroma signal of the current block at step S1470.

If the intra-prediction mode for the chroma signal of the current block is not 6 or more and 14 or less and is not 22 or more and 30 or less, up-right diagonal scanning is performed on the chroma signal of the current block at step S1480.

Figure 15:
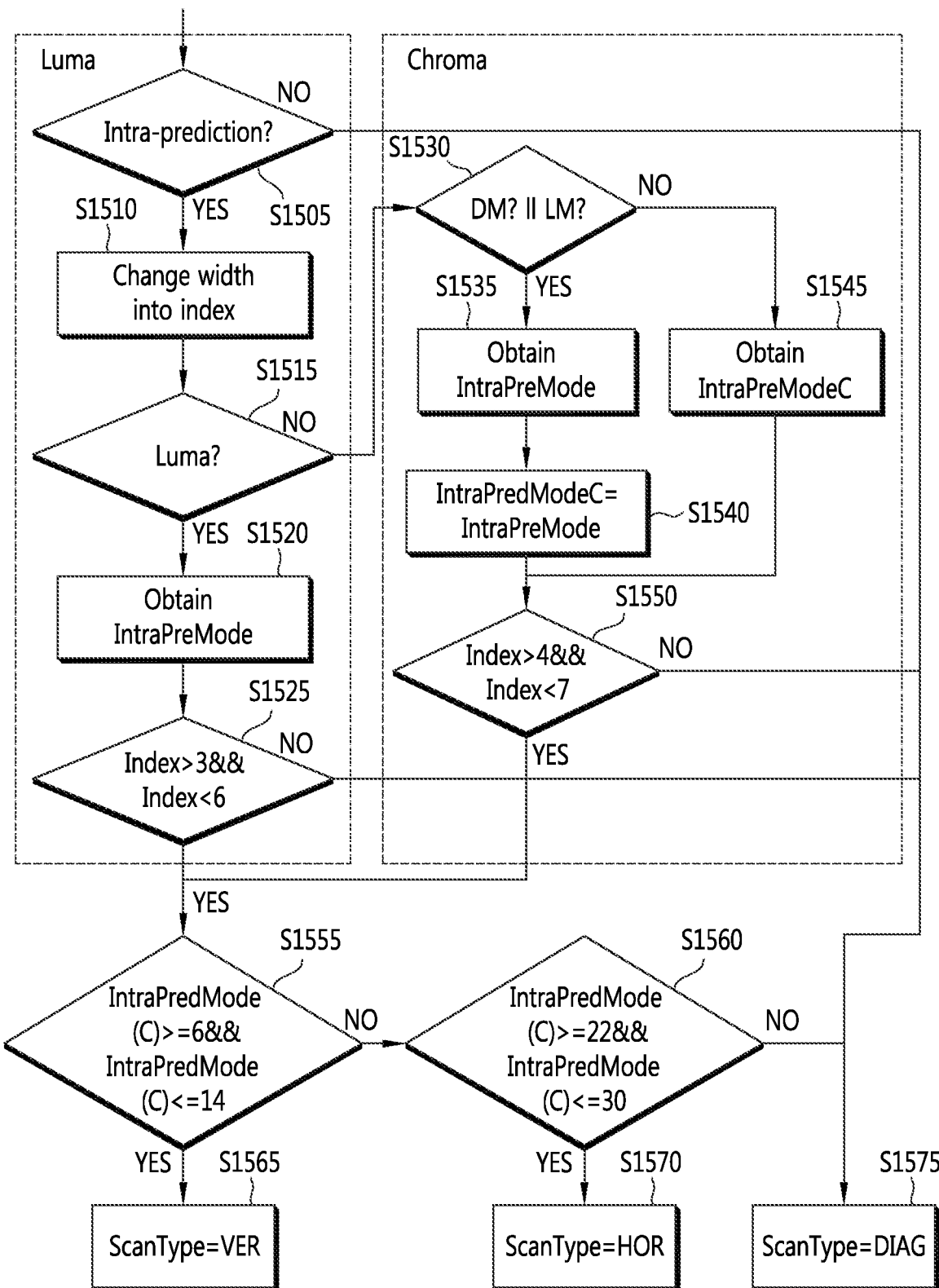
FIG. 15 is a flowchart illustrating another embodiment of a method of deriving a scanning direction for a chroma signal according to the present embodiment.

[Embodiment 2-2] A Method and Apparatus for Applying a Scanning Direction for a Luma Signal to a Chroma Signal without Change when the Intra-Prediction Direction of the Chroma Signal is the Same as the Intra-Prediction Direction of the Luma Signal or an Intra-Prediction Mode for the Chroma Signal is Intra_FromLuma FIG. 15 is a flowchart illustrating another embodiment of a method of deriving a scanning direction for a chroma signal according to the present embodiment.

From FIG. 15, it can be seen that a DM method (i.e., a method of using an intra-prediction direction mode for a luma signal as an intra-prediction direction mode for a chroma signal or it means that the intra-prediction direction of the chroma signal becomes equal to the intra-prediction direction of the luma signal) and the LM (Intra_FromLuma) method are unified into one.

First, whether or not a current block has been subjected to intra-prediction is determined at step S1505. If, as a result of the determination, it is determined that an intra-prediction mode has not been applied to the current block, up-right diagonal scanning is performed on the current block at step S1575.

If, as a result of the determination, it is determined that the current block has been subjected to intra-prediction, the width of the current block is changed into an index at step S1510.

Whether or not a target sample to be determined is a luma signal is determined at step S1515. If, as a result of the determination, it is determined that the target sample is not a luma signal, whether or not the DM or LM is applied to the current block is determined at step S1530. If, as a result of the determination, it is determined that the target sample is a luma signal, information about an intra-prediction mode is obtained at step S1520.

If the present invention is limitedly applied to a case where intra-frame encoding or decoding is performed on a chroma signal using the DM without using the LM for the purpose of profiling depending on an application field, whether or not the DM is applied without determining whether or not the LM is applied may be determined at step S1530 in the example of FIG. 15.

After obtaining the information about an intra-prediction mode, if the index is greater than 3 and smaller than 6 (i.e., a transform size is 8×8 or 4×4) at step S1525, whether or not an intra-prediction mode for the luma signal of the current block is 6 or more and 14 or less is determined at step S1555. If, as a result of the determination, it is determined that the intra-prediction mode for the luma signal of the current block is 6 or more and 14 or less, vertical scanning is performed on the luma signal of the current block at step S1565.

If, as a result of the determination, it is determined that the intra-prediction mode for the luma signal of the current block is not 6 or more and 14 or less, whether or not the intra-prediction mode for the luma signal of the current block is 22 or more and 30 or less is determined at step S1560. If, as a result of the determination, it is determined that the intra-prediction mode for the luma signal of the current block is 22 or more and 30 or less, horizontal scanning is performed on the current block at step S1570. If, as a result of the determination, it is determined that the intra-prediction mode for the luma signal of the current block is not 22 or more and 30 or less, up-right diagonal scanning is performed on the current block at step S1575.

Meanwhile, if, as a result of the determination at step S1515, it is determined that the target sample is a chroma signal not a luma signal, whether or not a mode for the current block is the DM or LM is determined at step S1530. If, as a result of the determination, it is determined that the mode for the chroma signal of the current block is not the DM or LM, information about an intra-prediction mode for the chroma signal is obtained at step S1545. If, as a result of the determination, it is determined that the mode for the chroma signal of the current block is the DM or LM, information about an intra-prediction mode for the luma signal is obtained at step S1535. In order to determine a scanning direction for the chroma signal, the intra-prediction mode for the chroma signal is set as an intra-prediction mode for the luma signal at step S1540.

Next, whether or not the index is greater than 4 and smaller than 7 (i.e., whether a transform size is 4×4 or 2×2) is determined at step S1550. If, as a result of the determination, it is determined that the index is not greater than 4 and smaller than 7, up-right diagonal scanning is performed on the chroma signal of the current block at step S1575.

If, as a result of the determination, it is determined that the index is greater than 4 and smaller than 7, whether or not the intra-prediction mode for the chroma signal of the current block is 6 or more and 14 or less is determined at step S1555.

If, as a result of the determination, it is determined that the intra-prediction mode for the chroma signal of the current block is 6 or more and 14 or less, vertical scanning is performed on the chroma signal of the current block at step S1565.

If, as a result of the determination, it is determined that the intra-prediction mode for the chroma signal of the current block is not 6 or more and 14 or less, whether or not the intra-prediction mode for the chroma signal of the current block is 22 or more and 30 or less is determined at step S1560. If, as a result of the determination, it is determined that the intra-prediction mode for the luma signal of the current block is 22 or more and 30 or less, horizontal scanning is performed on the current block at step S1570. If, as a result of the determination, it is determined that the intra-prediction mode for the luma signal of the current block is not 22 or more and 30 or less, up-right diagonal scanning is performed on the current block at step S1575.

Table 5 is obtained by incorporating the examples of FIGS. 14 and 15 into a syntax structure for a Transform Unit (hereinafter referred to as a 'TU').

Table 5 shows an example of the TU syntax according to the present embodiment 1.

TABLE 5

| | Descriptor |
|---|---|
| transform_unit( x0, y0, xC, yC, log2TrafoWidth, log2TrafoHeight, trafoDepth, blkIdx ) { | |
| ... | |
|   log2TrafoSize = ( ( log2TrafoWidth + log2TrafoHeight ) >> 1 ) | |
|   log2TrafoSizeC = ( ( log2TrafoSize = = Log2MinTrafoSixeC ) ? | |
|     log2TrafoSize : log2TrafoSize − 1 ) | |
|   if( PredMode = = MODE_INTRA ) { | |
|     scanIdx = ScanType[ log2TrafoSize − 2 ][ IntraPredMode ] | |
|     scanIdxC = ( IntraPredModeC = = Intra_FromLuma ) ? scanIdx : | |
|       ScanType[ log2TrafoSize − 2 ][ IntraPredModeC ] | |
|   } else { | |
|     scanIdx = 0 | |
|     scanIdxC = 0 | |
|   } | |
| ... | |

In Table 5, transform_unit indicates order of bit streams for one TU block. log 2TrafoSize indicates a result of right shift operation for the sum of log 2TrafoWidth and log 2TrafoHeight and indicates the size of a TU block for a luma signal.

log 2TrafoSizeC indicates the size of a TU block for a chroma signal. PredMode indicates an encoding mode for a current block. PredMode is 'Intra' in the case of intra-frame encoding and is 'Inter' in the case of inter-frame encoding.

scanIdx indicates information about a scanning direction for the luma signal of a current TU block and includes an up-right direction DIAG (Up-right=0), a horizontal direction HOR (Horizontal=1), and a vertical direction VER (Vertical=2).

scanIdxC indicates information about a scanning direction for the chroma signal of a current TU block and includes an up-right direction DIAG (Up-right=0), a horizontal direction HOR (Horizontal=1), and a vertical direction VER (Vertical=2).

ScanType is determined based on the table of a method of determining a scanning direction according to a frame prediction direction of Table 2.

IntraPredMode indicates information about an intra-prediction direction for a luma signal. IntraPredModeC indicates information about an intra-prediction direction for a chroma signal. As indicated in the syntax table, if a value of IntraPredModeC is Intra_FromLuma, a scanning direction used in a luma signal is applied to a chroma signal without change.

In relation to Table 5, a transform coefficient level can be parsed in a transCoeffLevel array. Here, if PredMode is Intra, a different scanning direction is applied depending on an intra-prediction direction mode. This scanning direction can be obtained from the ScanType array in Table 6 below. In order to obtain scanIdx, that is, a scanning direction indicator for a luma signal, a value of IntraPredMode indicative of an intra-prediction mode for the luma signal is used as a value of IntraPredModeValue in Table 6. In order to obtain scanIdxC, that is, a scanning direction indicator for a chroma signal, a value IntraPredModeC indicative of an intra-prediction mode for the chroma signal is used as a value of IntraPredModeValue in Table 6.

Table 6 shows an example of a method of determining a scan type.

TABLE 6

| | log2TrafoSize − 2 | | | |
|---|---|---|---|---|
| IntraPredMode Value | 0 | 1 | 2 | 3 |
| 0 | 0 | 0 | 0 | 0 |
| 1 | 0 | 0 | 0 | 0 |
| 2-5 | 0 | 0 | 0 | 0 |
| 6-14 | 2 | 2 | 0 | 0 |
| 15-21 | 0 | 0 | 0 | 0 |
| 22-30 | 1 | 1 | 0 | 0 |
| 31-34 | 0 | 0 | 0 | 0 |

In Table 6, a scan type ScanType can be determined by log 2TrafoSize and IntraPredModeValue as follows: ScanType[log 2TrafoSize-2][IntraPredModeValue]

As described above, a transform coefficient level is parsed in a transCoeffLevel array. Here, if PredMode is 'Intra', a different scanning direction is used depending on an intra-prediction direction mode.

Here, ScanType[log 2TrafoSize-2][IntraPredModeValue] can be set according to a syntax structure of Table 7 based on the size 'log 2TrafoSize' and an intra-prediction direction mode 'IntraPredModeValue' of a luma signal transform block.

TABLE 7

- If ( log2TrafoSize == 2 || log2TrafoSize == 3 ) the following applies.
  - If ( IntraPredModeValue >= 22 && IntraPredMode Value <= 30 ), ScanType[ log2TrafoSize − 2 ][ IntraPredModeValue ] is set to 1.
  - Otherwise, if ( IntraPredModeValue >= 6 && IntraPredModeValue <= 10 ), ScanType[ log2TrafoSize − 2 ][ IntraPredModeValue ] is set to 2.
  - Otherwise, ScanType[ log2TrafoSize − 2 ][ IntraPredModeValue ] is set to 0.
- Otherwise, ScanType[ log2TrafoSize − 2 ][ IntraPredModeValue ] is set to 0.

In order to obtain scanIdx, that is, a scanning direction indicator for a luma signal, a value of IntraPredMode indicative of an intra-prediction mode for the luma signal is used as a value of IntraPredModeValue in Table 2. In order to obtain scanIdxC, that is, a scanning direction indicator for a chroma signal, a value of IntraPredModeC indicative of an intra-prediction mode for the chroma signal is used as a value of IntraPredModeValue in Table 2.

The present embodiment can also be applied to the following cases in addition to a case where a current chroma block has been encoded in Intra_FromLuma (LM).

1. In predicting a chroma block, the present embodiment can be applied to all methods of multiplying a reconstructed luma signal block by weight and adding an offset to a result of the multiplication.

2. In predicting a chroma block, the present embodiment can be applied to all methods of predicting a chroma block using a template shift for reconstructed luma signal and chroma signal blocks. Here, the template shift is used to derive a correlation between a luma signal and a chroma signal.

In addition, the present embodiment can be applied in various ways.

For example, the present embodiment can be differently applied to an application scope depending on the size of all blocks, a CU depth, or a TU depth. A parameter (i.e., information about the size or depth) used to determine an application scope as described above may be set so that a predetermined value is used in an encoder and a decoder, or a predetermined value may be used depending on a profile or level. For example, when an encoder writes a parameter value in a bit stream, a decoder may obtain a value from the bit stream and use the value.

If the application scope is different depending on a CU depth, one of the following 3 methods can be used as illustrated in Table 8: A method A) of applying the application scope to only a depth equal to or greater than a specific depth, a method B) of applying the application scope to only a depth equal to or smaller than a specific depth, and a method C) of applying the application scope to only a specific depth.

Table 8 shows an example of methods of determining the application scope in which each of the three methods according to the present embodiment is applied when a specific CU (or TU) depth is 2. In Table 8, 'O' indicates that the application scope is applied to a corresponding depth, and 'X' indicates that the application scope is not applied to a corresponding depth.

TABLE 8

| CU (OR TU) DEPTH INDICATING APPLICATION SCOPE | METHOD A | METHOD B | METHOD C |
|---|---|---|---|
| 0 | X | O | X |
| 1 | X | O | X |
| 2 | O | O | O |
| 3 | O | X | X |
| 4 | O | X | X |

If the methods of the present invention are not applied to all depths, it may be indicated using a specific indicator (or flag) or may be represented by signaling a value that is 1 greater than a maximum value of a CU depth using as a CU depth value indicative of the application scope.

Furthermore, it is to be noted that a method of determining an application scope in which the methods of the present invention are applied can be applied to the aforementioned embodiment 1 and embodiments to be described later individually or in combination.

[Embodiment 3] A Method and Apparatus for Selectively Deriving a Frequency Transform Method for the Residual Picture of a Chroma Signal Based on an Intra-Prediction Direction Mode for the Chroma Signal In the present embodiment, encoding efficiency can be improved by applying a selective frequency transform method according to an intra-prediction direction mode to which the residual picture of a luma signal has been applied to the residual picture of a chroma signal.

Furthermore, in the present embodiment, frequency transform can be selectively performed based on a property that a residual signal for a chroma signal obtained by the Intra_FromLuma method has a similar characteristic to the residual signal of a luma signal.

Figure 16:
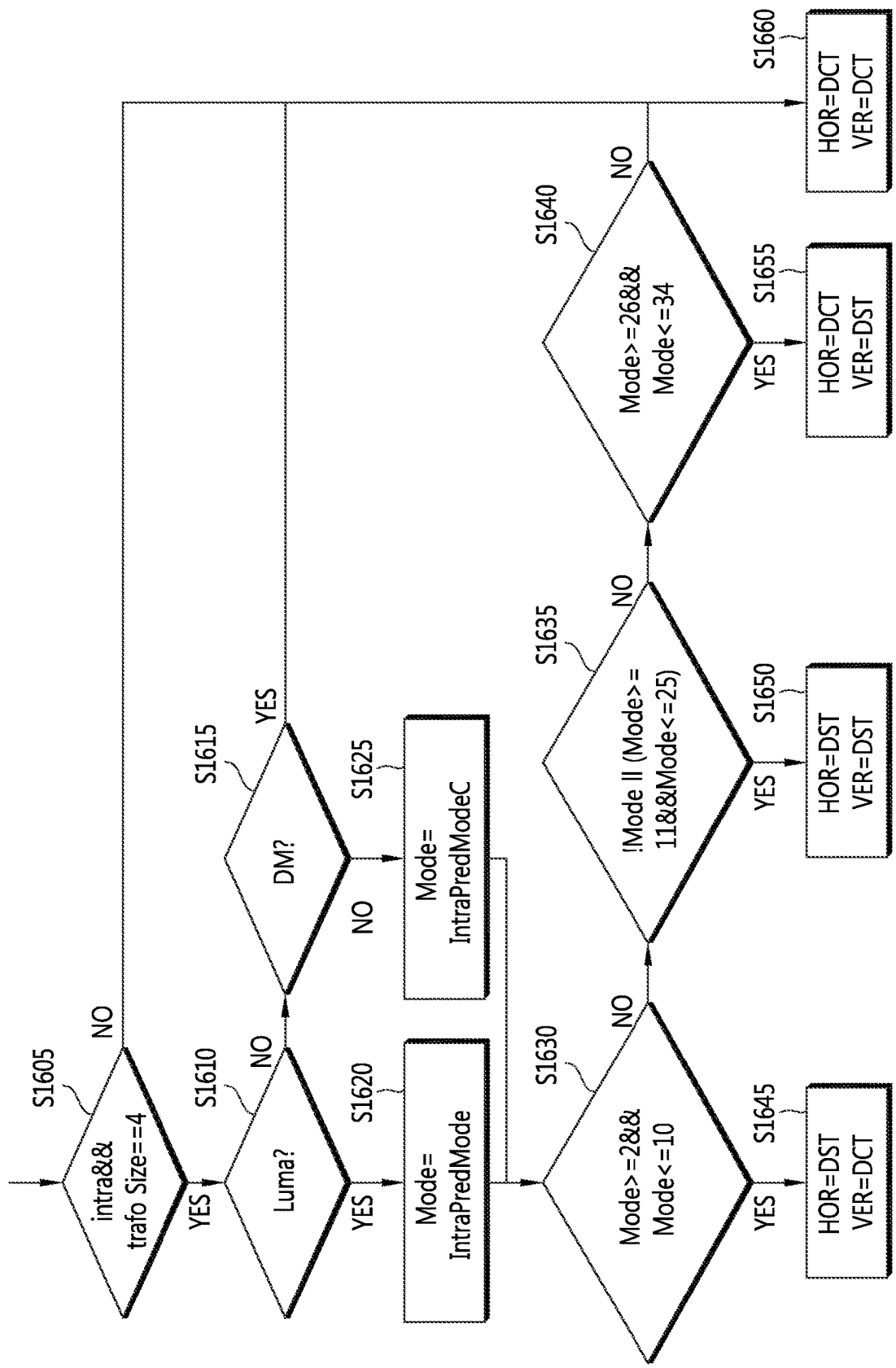
FIG. 16 is a flowchart illustrating an example of a method of selectively deriving a frequency transform method for the residual picture of a chroma signal based on an intra-prediction direction mode for the chroma signal according to the present embodiment.

FIG. 16 is a flowchart illustrating an example of a method of selectively deriving a frequency transform method for the residual picture of a chroma signal based on an intra-prediction direction mode for a chroma signal according to the present embodiment.

Referring to FIG. 16, first, if a current block has been subjected to intra-frame encoding 'Intra' and the current block has a 4×4 size (trafoSize (or iWidth)==4) at step S1605, integer DST or integer DCT is applied to a frequency transform method for the current block. If the current block does not have a 4×4 size (trafoSize (or iWidth)==4) at step S1605, DCT can be applied to a frequency transform method for the current block at step S1660.

Next, if the current block is a luma block at step S1610, an intra-prediction direction mode IntraPredMode for a luma signal is obtained at step S1620. Here, the intra-prediction direction mode for the luma signal of the current block can be used to derive a frequency transform method for the residual picture of the luma signal.

If the current block is a chroma block at step S1610, whether or not the chroma block is a DM block is determined at step S1615.

If, as a result of the determination, it is determined that the current block is a DM block, DCT can be applied to a frequency transform method for the current block at step S1660. If, as a result of the determination at step S1615, it is determined that the current block is not a DM block, the intra-prediction direction mode for the chroma signal can be used to derive a frequency transform method for the residual picture of the chroma signal at step S1625.

Here, if the chroma block has been encoded in DM, DST, DCT, or other frequency transform methods can be applied to an intra-prediction direction mode corresponding to the EM (e.g., a planar mode PLANAR, a mean mode DC, a horizontal mode HOR, a vertical mode VER, or a mode located at an eighth place in a vertical direction (e.g., Ver+8 or No. 34 mode)), from the DMs.

Next, if the intra-prediction direction mode for the current block (i.e., the luma and chroma signal blocks) is 2 or more and 10 or less at step S1630, integer DST can be applied to a frequency transform method for the current block (i.e., the luma and chroma signal blocks) in a horizontal direction and integer DCT can be applied to a frequency transform method for the current block (i.e., the luma and the chroma signal blocks) in a vertical direction at step S1645.

In contrast, if the intra-prediction direction mode for the current block (i.e., the luma and chroma signal blocks) is 0 (PLANAR) or is 11 or more and 25 or less at step S1635, integer DST can be applied to a frequency transform method for the current block (i.e., the luma and chroma signal blocks) in both horizontal and vertical directions at step S1650.

In contrast, if the intra-prediction direction mode for the current block (i.e., the luma and chroma signal blocks) is 26 or more and 34 or less at step S1640, integer DCT can be applied to a frequency transform method for the current block (i.e., the luma and chroma signal blocks) in a horizontal direction and integer DST can be applied to a frequency transform method for the current block (i.e., the luma and chroma signal blocks) in a vertical direction at step S1655.

If the intra-prediction direction mode for the current block (i.e., the luma and chroma signal blocks) is not 26 or more and 34 or less at step S1640, integer DCT can be applied to a frequency transform method for the current block (i.e., the luma and chroma signal blocks) in both horizontal and vertical directions at step S1660.

The method of FIG. 16 can be incorporated into a transform process for scaled transform coefficients as follows.

Transform Process for Scaled Transform Coefficients into which the Example of FIG. 16 has been Incorporated In this case, the input is as follows.

The width of a current transform block: nW

The height of the current transform block: nH

An array of scaled transform coefficients having an element dij: (nW×nH) array d An index for the luma signal and the chroma signal of a current block: cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

In this case, the output is as follows.

An array for a residual signal obtained by inversely transforming the scaled transform coefficients: (nW×nH) array r If an encoding mode 'PredMode' for the current block is an intra-prediction mode 'Intra', a value of Log 2(nW*nH) is 4, and a signal is a luma signal, parameters horizTrType and vertTrType according to Table 9 are used depending on intra-prediction direction modes for the luma signal.

In the case of a chroma signal, if an intra-prediction encoding mode for the chroma signal is smaller than 4, the parameters horizTrType and vertTrType according to Table 9 are used depending on intra-prediction direction modes for the chroma signal. If not, the parameters horizTrType and vertTrType are set to 0.

If an intra-prediction direction mode for the chroma signal is '35', the parameters horizTrType and vertTrType are set to 0.

Next, the sizes nW and nH and array 'nW×nH array g' of the current block and the parameter vertTrType are received, and 1-D inverse transform is performed in a vertical direction.

Next, an array 'nW×nH array r' for the residual signals is set based on cIdx as in Equation 6.

$$r_{ij}=(f_{ij}+(1<<(\text{shift}-1)))>>\text{shift} \qquad \text{<Equation 6>}$$

Here, when cIdx is 0, shift=20−BitDepth$_Y$. When cIdx is not 0, shift=20−BitDepth$_C$. BitDepth indicates the number of bits (e.g., 8 bits) of a sample for a current picture.

Figure 17:
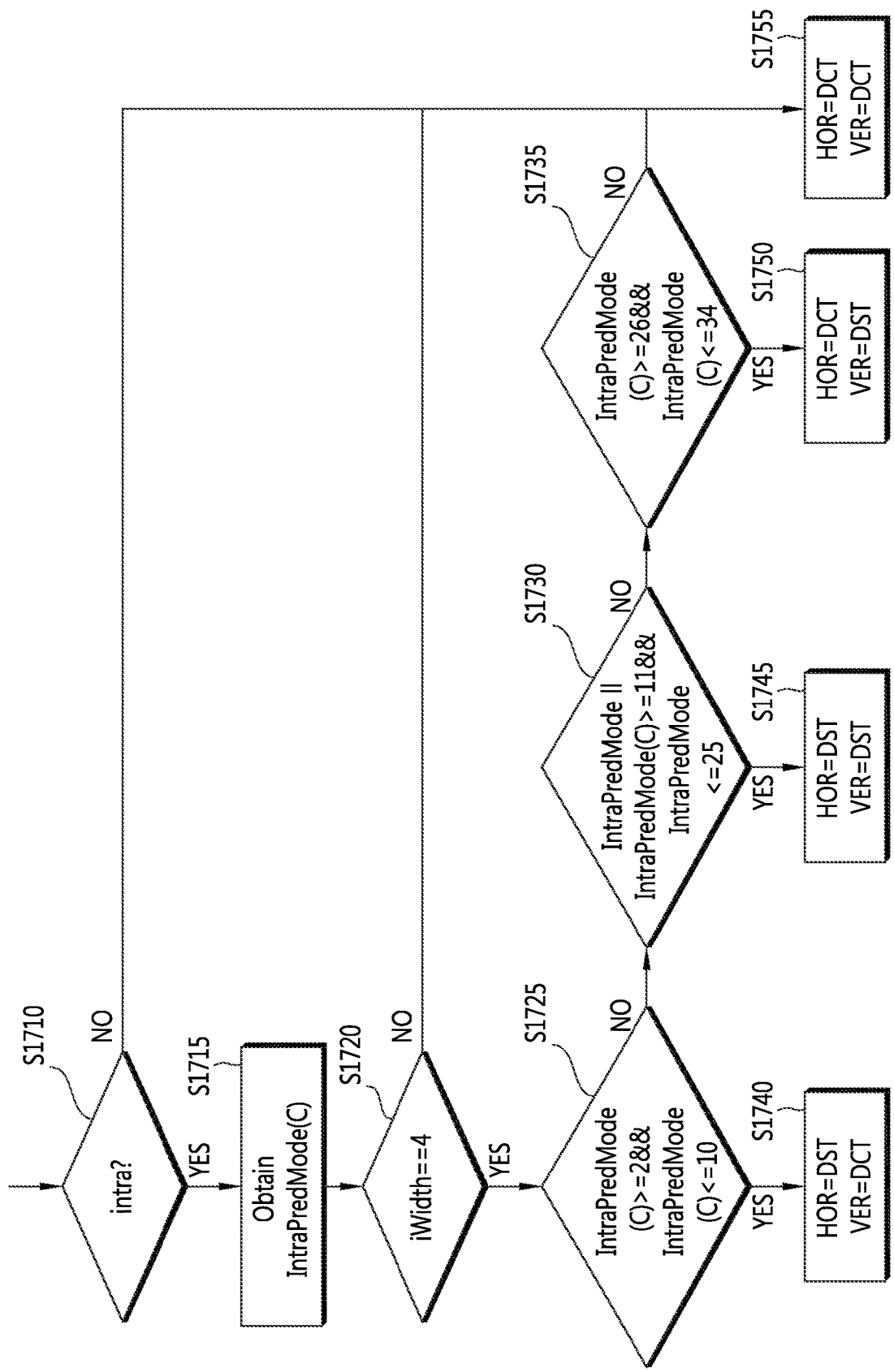
FIG. 17 is a flowchart illustrating another example of a method of selectively deriving a frequency transform method for the residual picture of a chroma signal based on an intra-prediction direction mode for the chroma signal according to the present embodiment.

FIG. 17 is a flowchart illustrating another example of a method of selectively deriving a frequency transform method for the residual picture of a chroma signal based on an intra-prediction direction mode for the chroma signal according to the present embodiment.

Referring to FIG. 17, first, whether or not a current block has been subjected to intra-frame encoding 'Intra' is determined at step S1710. If, as a result of the determination, it is determined that the current block has been subjected to intra-frame encoding, integer DST or integer DCT is applied to a frequency transform method for the current block.

If, as a result of the determination, it is determined that the current block has not been subjected to intra-frame encoding 'Intra', an intra-prediction direction mode 'IntraPredMode (C)' for the luma or chroma signal of the current block is obtained at step S1715. Here, when deriving a frequency transform method for the luma signal, IntraPredMode(C) is changed into IntraPredMode (i.e., the intra-prediction direction mode for the luma signal). When deriving a frequency transform method for the chroma signal, IntraPredMode(C) is changed into IntraPredModeC (i.e., the intra-prediction direction mode for the chroma signal). Here, the intra-prediction direction mode for the luma signal of the current block can be used to derive a frequency transform method for the residual picture of the luma signal, and the intra-prediction direction mode for the chroma signal of the current block can be used to derive a frequency transform method for the residual picture of the chroma signal.

Here, an intra-prediction direction mode for selecting a frequency transform method can be obtained in various ways as in one of the following 1 to 3 methods.

TABLE 9

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |
| IntraPredMode | 18 | 19 | 20 | 21 | 22 | 23 | 24 | 25 | 26 | 27 | 28 | 29 | 30 | 31 | 32 | 33 | 34 | |
| vertTrType | 1 | 1 | 1 | 1 | 1 | 1 | 1 | 1 | 1 | 1 | 1 | 1 | 1 | 1 | 1 | 1 | 1 | |
| horizTrType | 1 | 1 | 1 | 1 | 1 | 1 | 1 | 1 | 0 | 0 | 0 | 0 | 0 | 0 | 0 | 0 | 0 | |

An inverse transform process is performed on the scaled transform coefficients using the parameters horizTrType and vertTrType value. First, the sizes nW and nH and scaled transform coefficients array 'nW×nH array d' of the current block and the parameter horizTrType are received, 1-D inverse transform is performed in a horizontal direction, and an array 'nW×nH array e' is output as a result of the 1-D inverse transform.

Next, an array 'nW×nH array e' is received, and an array 'nW×nH array g' is derived as in Equation 5 using the array.

$$g_{ij}=\text{Clip3}(-32768,32767,(e_{ij}+64)>>7) \qquad \text{<Equation 5>}$$

1. An intra-prediction direction mode for the luma signal of a current block can be used to derive a frequency transform method by applying the intra-prediction direction mode to both the residual pictures of the luma signal and a chroma signal.

2. An intra-prediction direction mode for the chroma signal of a current block can be used to derive a frequency transform method by applying the intra-prediction direction mode to both the residual pictures of a luma signal and the chroma signal.

3. Only integer DCT or integer DST can be used in the luma signal of a current block. Furthermore, an intra-prediction direction mode for the chroma signal of the current block can be used to derive a frequency transform method for the residual picture of the chroma signal.

In addition, a frequency transform method can be derived in various ways.

Next, whether or not the current block has a 4×4 size (iWidth==4) is determined at step S1720. If, as a result of the determination, it is determined that the current block does not have a 4×4 size (iWidth==4), integer transform or integer DCT is applied to a frequency transform method for the current block at step S1755.

If, as a result of the determination, it is determined that the current block has a 4×4 size (iWidth==4), an intra-prediction direction mode for the current block is checked.

If the intra-prediction direction mode of the current block is 2 or more and 10 or less at step S1725, integer DST can be applied to a frequency transform method for the current block in a horizontal direction and integer DCT can be applied to a frequency transform method for the current block in a vertical direction at step S1740.

In contrast, if the intra-prediction direction mode of the current block is 0 or is 11 or more and 25 or less at step S1730, integer DST can be applied to a frequency transform method for the current block in both horizontal and vertical directions at step S1745.

In contrast, if the intra-prediction direction mode of the current block is 26 or more and 34 or less at step S1735, integer DCT can be applied to a frequency transform method for the current block in a horizontal direction and integer DST can be applied to a frequency transform method for the current block in a vertical direction at step S1750.

If the intra-prediction direction mode of the current block is not 26 or more and 34 or less at step S1735, integer DCT can be applied to a frequency transform method for the current block in both horizontal and vertical directions at step S1755.

Here, a frequency transform method according to an intra-prediction direction mode can be used in various ways. For example, if an intra-prediction direction mode for a current block is 2 or more and 10 or less, a frequency transform method may be applied as in the above-described example. As another method, integer DCT can be applied to a frequency transform method for the current block in a horizontal direction and integer DST can be applied to a frequency transform method for the current block in a vertical direction. As yet another method, integer DCT can be applied to a frequency transform method for the current block in both horizontal and vertical directions, or integer DST can be applied to a frequency transform method for the current block in both horizontal and vertical directions. Furthermore, integer DST may be applied all horizontal and vertical directions other than a DC mode (i.e., mode not a mean value prediction and direction mode).

A method of applying various frequency transform methods in various ways as described above can be applied to other intra-prediction direction mode scopes in addition to a case where an intra-prediction direction mode for a current block is 2 or more and 10 or less. The following contents can be applied to the following embodiments in the same manner.

The method of FIG. 17 can be incorporated into a transform process for scaled transform coefficients as follows.

Transform Process for Scaled Transform Coefficients into which the Example of FIG. 17 has been Incorporated In this case, the input is as follows.

The width of a current transform block: nW

The height of the current transform block: nH

An array of scaled transform coefficients having an element dij: (nW×nH) array d An index for the luma signal and the chroma signal of a current block: cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

In this case, the output is as follows.

An array for a residual signal obtained by inversely transforming the scaled transform coefficients: (nW×nH) array r If an encoding mode 'PredMode' for the current block is an intra-prediction mode 'Intra' and a value of Log 2(nW*nH) is 4, (1) parameters horizTrType and vertTrType according to Table 10 are used depending on intra-prediction direction modes for a luma signal and (2) the parameters horizTrType and vertTrType according to Table 10 are used depending on intra-prediction direction modes for a chroma signal. If not, the parameters horizTrType and vertTrType are set to 0.

TABLE 10

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |
| IntraPredMode | 18 | 19 | 20 | 21 | 22 | 23 | 24 | 25 | 26 | 27 | 28 | 29 | 30 | 31 | 32 | 33 | 34 | |
| vertTrType | 1 | 1 | 1 | 1 | 1 | 1 | 1 | 1 | 1 | 1 | 1 | 1 | 1 | 1 | 1 | 1 | 1 | |
| horizTrType | 1 | 1 | 1 | 1 | 1 | 1 | 1 | 1 | 0 | 0 | 0 | 0 | 0 | 0 | 0 | 0 | 0 | |

An inverse transform process is performed on the scaled transform coefficients using the parameters horizTrType and vertTrType value. First, the sizes nW and nH and scaled transform coefficients array 'nW×nH array d' of the current block and the parameter horizTrType are received, 1-D inverse transform is performed in a horizontal direction, and an array 'nW×nH array e' is output as a result of the 1-D inverse transform.

Next, an array 'nW×nH array e' is received, and an array 'nW×nH array g' is derived as in Equation 7 using the array.

$$g_{ij} = \text{Clip3}(-32768, 32767, (e_{ij}+64) >> 7) \quad \text{<Equation 7>}$$

Next, the sizes nW and nH and array 'nW×nH array g' of the current block and the parameter vertTrType are received, and 1-D inverse transform is performed in a vertical direction.

Next, an array 'nW×nH array r' for the residual signals is set based on cIdx as in Equation 8.

$$r_{ij} = (f_{ij} + (1 << (\text{shift}-1))) >> \text{shift} \quad \text{<Equation 8>}$$

Here, when cIdx is 0, shift=20−BitDepth$_Y$. When cIdx is not 0, shift=20−BitDepth$_C$. BitDepth indicates the number of bits (e.g., 8 bits) of a sample for a current picture.

Figure 18:
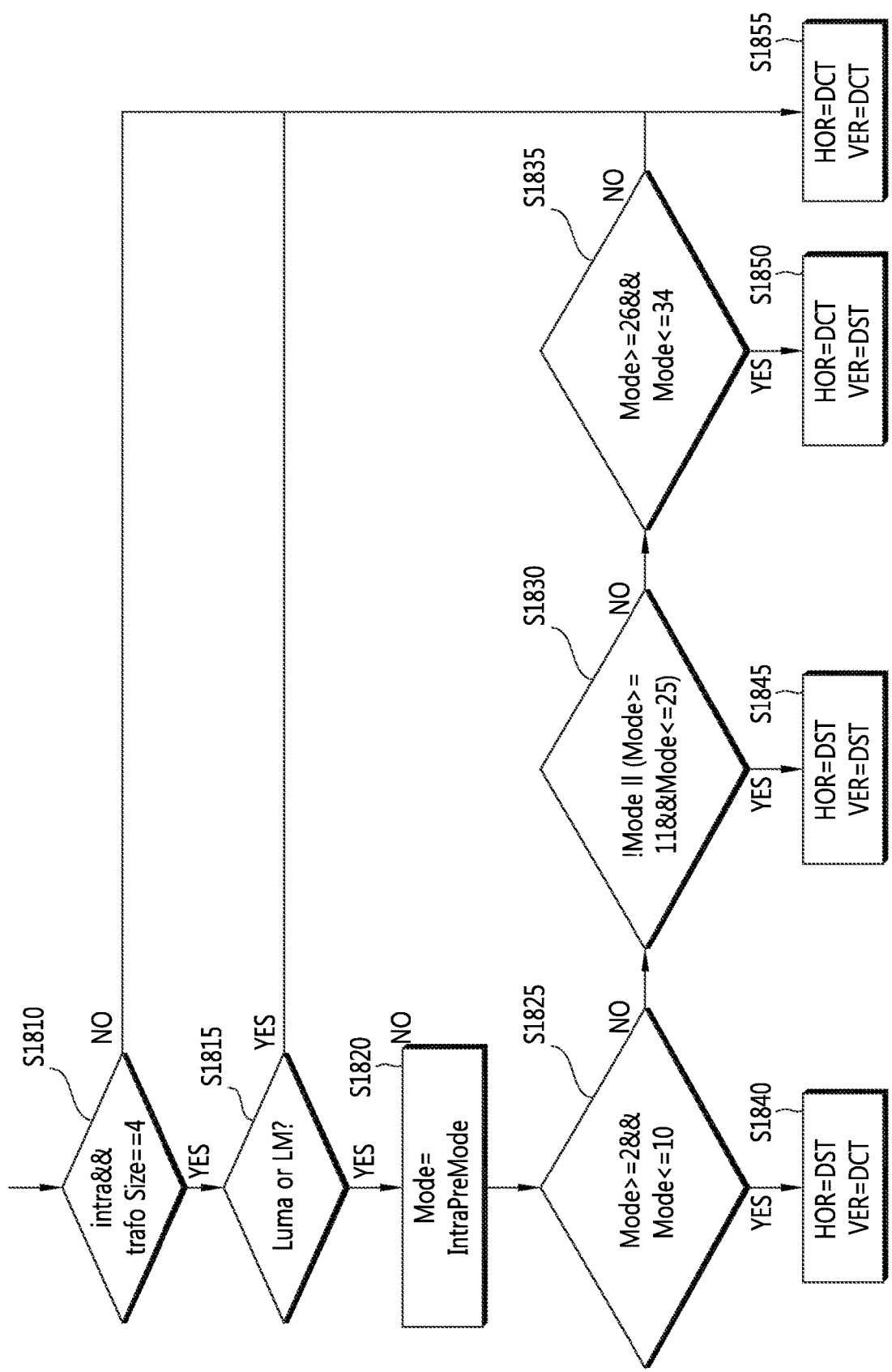
FIG. 18 is a flowchart illustrating an example of a method of selectively deriving a frequency transform method for the residual picture of a chroma signal based on an intra-prediction direction mode for a luma signal in relation to an Intra_FromLuma (LM) encoding mode for the chroma signal according to the present embodiment.

[Embodiment 4] A Method and Apparatus for Selectively Deriving a Frequency Transform Method for the Residual Picture of a Chroma Signal Based on an Intra-Prediction Direction Mode for a Luma Signal in Relation to an Intra_FromLuma (LM) Encoding Mode for the Chroma Signal FIG. 18 is a flowchart illustrating an example of a method of selectively deriving a frequency transform method for the residual picture of a chroma signal based on an intra-prediction direction mode for a luma signal in relation to the LM of the chroma signal according to the present embodiment.

Referring to FIG. 18, first, if a current block has been subjected to intra-frame encoding 'Intra' and the current block has a 4×4 size (TrafoSize (or iWidth)==4) at step S1810, integer DST or integer DCT is applied to a frequency transform method for the current block at step S1855. If the current block does not have a 4×4 size (trafoSize (or iWidth)==4) at step S1810, DCT can be applied to a frequency transform method for the current block.

Next, if the current block is a luma block or a chroma block and an intra-prediction direction mode for the chroma block is the LM at step S1815, an intra-prediction direction mode 'IntraPredMode' for the luma signal is obtained at step S1820.

Here, the intra-prediction direction mode for the luma signal of the current block can be used to derive a frequency transform method for the residual pictures of the luma signal and the chroma signal.

If the current block is a chroma block (i.e., a chroma block not the LM) at step S1815, DCT can be applied to a frequency transform method for the current block at step S1855.

Next, if the intra-prediction direction mode for the current block (i.e., the luma and chroma signal blocks) is 2 or more and 10 or less at step S1825, integer DST can be applied to a frequency transform method for the current block (i.e., the luma and chroma signal blocks) in a horizontal direction and In contrast, if the intra-prediction direction mode for the current block (i.e., the luma and chroma signal blocks) is 26 or more and 34 or less at step S1835, integer DCT can be applied to a frequency transform method for the current block (i.e., the luma and chroma signal blocks) in a horizontal direction and integer DST can be applied to a frequency transform method for the current block (i.e., the luma and chroma signal blocks) in a vertical direction at step S1850. If the intra-prediction direction mode for the current block (i.e., the luma and chroma signal blocks) is not 26 or more and 34 or less at step S1835, integer DCT can be applied to a frequency transform method for the current block (i.e., the luma and chroma signal blocks) in both horizontal and vertical directions at step S1855.

Meanwhile, a transform process for scaled transform coefficients according to the example of FIG. 18 is as follows.

A Transform Process for Scaled Transform Coefficients According to the Example of FIG. 18

In this case, the input is as follows.

The width of a current transform block: nW
The height of the current transform block: nH
An array of scaled transform coefficients having an element dij: (nW×nH) array d
An index for the luma signal and the chroma signal of a current block: cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

In this case, the output is as follows.

An array for a residual signal obtained by inversely transforming the scaled transform coefficients: (nW×nH) array r If an encoding mode 'PredMode' for the current block is an intra-prediction mode 'Intra' and a value of Log 2(nW*nH) is 4, parameters horizTrType and vertTrType according to Table 11 are used depending on intra-prediction direction modes for a luma signal and the parameters horizTrType and vertTrType according to Table 11 are used depending on intra-prediction direction modes for the chroma signal if an encoding mode for the chroma signal is Intra_FromLuma (LM). If not, the parameters horizTrType and vertTrType are set to 0.

TABLE 11

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |
| IntraPredMode | 18 | 19 | 20 | 21 | 22 | 23 | 24 | 25 | 26 | 27 | 28 | 29 | 30 | 31 | 32 | 33 | 34 |
| vertTrType | 1 | 1 | 1 | 1 | 1 | 1 | 1 | 1 | 1 | 1 | 1 | 1 | 1 | 1 | 1 | 1 | 1 |
| horizTrType | 1 | 1 | 1 | 1 | 1 | 1 | 1 | 1 | 0 | 0 | 0 | 0 | 0 | 0 | 0 | 0 | 0 | integer DCT can be applied to a frequency transform method for the current block (i.e., the luma and chroma signal blocks) in a vertical direction at step S1840.

In contrast, if the intra-prediction direction mode for the current block (i.e., the luma and chroma signal blocks) is 0 (PLANAR) or is 11 or more and 25 or less at step S1830), integer DST can be applied to a frequency transform method for the current block (i.e., the luma and chroma signal blocks) in both horizontal and vertical directions at step S1845.

An inverse transform process is performed on the scaled transform coefficients using the parameters horizTrType and vertTrType value. First, the sizes nW and nH and scaled transform coefficients array 'nW×nH array d' of the current block and the parameter horizTrType are received, 1-D inverse transform is performed in a horizontal direction, and an array 'nW×nH array e' is output as a result of the 1-D inverse transform.

Next, an array 'nW×nH array e' is received, and an array 'nW×nH array g' is derived as in Equation 9 using the array.

$$g_{ij} = \text{Clip3}(-32768, 32767, (e_{ij}+64) >> 7)$$  <Equation 9>

Next, the sizes nW and nH and array 'nW×nH array g' of the current block and the parameter vertTrType are received, and 1-D inverse transform is performed in a vertical direction.

Next, an array 'nW×nH array r' for the residual signals is set based on cIdx as in Equation 10.

$$r_{ij}=(f_{ij}+(1<<(\text{shift}-1)))>>\text{shift} \quad \text{<Equation 10>}$$

Here, when cIdx is 0, shift=20−BitDepth$_Y$. When cIdx is not 0, shift=20−BitDepth$_C$. BitDepth indicates the number of bits (e.g., 8 bits) of a sample for a current picture.

Figure 19:
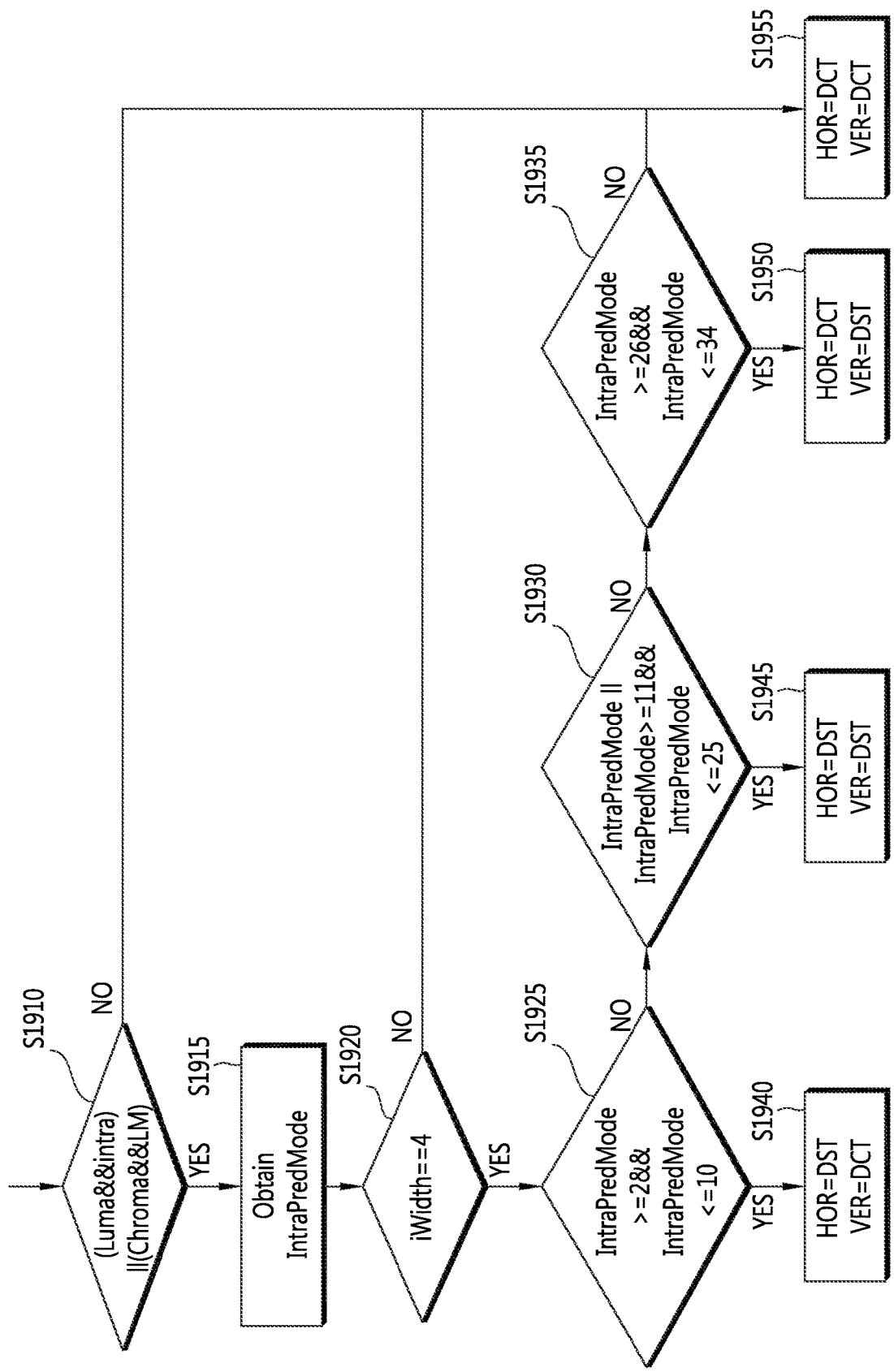
FIG. 19 is a flowchart illustrating another example of a method of selectively deriving a frequency transform method for the residual picture of a chroma signal based on an intra-prediction direction mode for a luma signal in relation to the Intra_FromLuma (LM) encoding mode of the chroma signal according to the present embodiment.

FIG. 19 is a flowchart illustrating another example of a method of selectively deriving a frequency transform method for the residual picture of a chroma signal based on an intra-prediction direction mode for a luma signal in relation to an Intra_FromLuma (LM) encoding mode for the chroma signal according to the present embodiment.

Referring to FIG. 19, whether or not a current block has been encoded according to Condition 1 (i.e., whether or not the current block has been subjected to intra-frame encoding 'Intra' and the current block is the block of a luma signal) or Condition 2 (i.e., whether or not the current block has the LM and the current block is the block of a chroma signal) is determined at step S1910.

If, as a result of the determination, Condition 1 or Condition 2 is not satisfied, integer transform or integer DCT can be applied to frequency transform methods for the luma signal and the chroma signal of the current block at step S1955.

If, as a result of the determination, Condition 1 or Condition 2 is satisfied, an intra-prediction direction mode 'IntraPredMode' for the luma signal of the current block is obtained at step S1915.

Here, an intra-prediction direction mode for the luma signal of the current block can be used to derive a frequency transform method for the residual picture of the luma signal. Furthermore, if the chroma signal of the current block has been encoded in the LM, an intra-prediction direction mode for the luma signal of the current block can be used to derive a frequency transform method for the residual picture of the chroma signal.

Next, whether or not the current block has a 4×4 size (iWidth==4) is determined at step S1920. If, as a result of the determination, it is determined that the current block does not have a 4×4 size (iWidth==4), integer transform or integer DCT can be applied to frequency transform methods for the luma signal and the chroma signal of the current block at step S1955. If, as a result of the determination, it is determined that the current block has a 4×4 size (iWidth==4), the intra-prediction direction mode for the current block is checked.

If the intra-prediction direction mode of the current block is 2 or more and 10 or less at step S1925, integer DST can be applied to a frequency transform method for the luma signal of the current block in a horizontal direction and integer DCT can be applied to a frequency transform method for the luma signal of the current block in a vertical direction at step S1940. If the chroma signal of the current block has been encoded in the LM, the frequency transform method for the luma signal of the current block can be used to perform frequency transform on the residual picture of the chroma signal.

If the chroma signal of the current block has not been encoded in the LM, integer DCT can be performed on the chroma signal of the current block in both horizontal and vertical directions at step S1955.

In contrast, if the intra-prediction direction mode of the current block is 0 or is 11 or more and 25 or less at step S1930, integer DST can be applied to a frequency transform method for the luma signal of the current block in both horizontal and vertical directions at step S1945. If the chroma signal of the current block has been encoded in the LM, the frequency transform method for the luma signal of the current block can be used to perform frequency transform on the residual picture of the chroma signal. If the chroma signal of the current block has not been encoded in the LM, integer DCT can be performed on the chroma signal of the current block in both horizontal and vertical directions at step S1955.

In contrast, if the intra-prediction direction mode of the current block is 26 or more and 34 or less at step S1935, integer DCT can be applied to a frequency transform method for the luma signal of the current block in a horizontal direction and integer DST can be applied to a frequency transform method for the luma signal of the current block in a vertical direction at step 1950. If the chroma signal of the current block has been encoded in the LM, a frequency transform method for the luma signal of the current block can be used to perform frequency transform on the residual picture of the chroma signal. If the chroma signal of the current block has not been encoded in the LM, integer DCT can be performed on the chroma signal of the current block in both horizontal and vertical directions at step S1955.

If the intra-prediction direction mode of the current block is not 26 or more and 34 or less at step S1935, integer DCT can be applied to a frequency transform method for the residual pictures of the luma signal and the chroma signal of the current block in both horizontal and vertical directions at step S1955.

A transform process for scaled transform coefficients into which the example of FIG. 19 has been incorporated is as follows.

A Transform Process for Scaled Transform Coefficients into which the Example of FIG. 19 has been Incorporated In this case, the input is as follows.

The width of a current transform block: nW

The height of the current transform block: nH

An array of scaled transform coefficients having an element dij: (nW×nH) array d An index for the luma signal and the chroma signal of a current block: cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

In this case, the output is as follows.

An array for a residual signal obtained by inversely transforming the scaled transform coefficients: (nW×nH) array r If an encoding mode 'PredMode' for the current block is an intra-prediction mode 'Intra' and a value of Log 2(nW*nH) is 4, parameters horizTrType and vertTrType according to Table 12 are used depending on intra-prediction direction modes for a luma signal and the parameters horizTrType and vertTrType according to Table 12 are used depending on intra-prediction direction modes for the chroma signal if an encoding mode for the chroma signal is Intra_FromLuma (LM). If not, the parameters horizTrType and vertTrType are set to 0.

TABLE 12

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |

| IntraPredMode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| vertTrType | 1 | 1 | 1 | 1 | 1 | 1 | 1 | 1 | 1 | 1 | 1 | 1 | 1 | 1 | 1 | 1 | 1 |
| horizTrType | 1 | 1 | 1 | 1 | 1 | 1 | 1 | 1 | 0 | 0 | 0 | 0 | 0 | 0 | 0 | 0 | 0 |

An inverse transform process is performed on the scaled transform coefficients using the parameters horizTrType and vertTrType value. First, the sizes nW and nH and scaled transform coefficients array 'nW×nH array d' of the current block and the parameter horizTrType are received, 1-D inverse transform is performed in a horizontal direction, and an array 'nW×nH array e' is output as a result of the 1-D inverse transform.

Next, an array 'nW×nH array e' is received, and an array 'nW×nH array g' is derived as in Equation 11 using the array.

$$g_{ij}=\text{Clip3}(-32768, 32767, (e_{ij}+64)>>7) \quad \text{<Equation 11>}$$

Next, the sizes nW and nH and array 'nW×nH array g' of the current block and the parameter vertTrType are received, and 1-D inverse transform is performed in a vertical direction.

Next, an array 'nW×nH array r' for the residual signals is set based on cIdx as in Equation 12.

$$r_{ij}=(f_{ij}+(1<<(\text{shift}-1)))>>\text{shift} \quad \text{<Equation 12>}$$

Here, when cIdx is 0, shift=20−BitDepth$_Y$. When cIdx is not 0, shift=20−BitDepth$_C$. BitDepth indicates the number of bits (e.g., 8 bits) of a sample for a current picture.

The present embodiment can also be applied to various cases, such as 1 and 2 below, in addition to a case where a current chroma block has been encoded in Intra_FromLuma (LM).

1. In predicting a chroma block, the present embodiment can be applied to all methods of multiplying a reconstructed luma signal block by weight and adding an offset to a result of the multiplication.

2. In predicting a chroma block, the present embodiment can be applied to all methods of predicting a chroma block using a template shift for reconstructed luma signal and chroma signal blocks. Here, the template shift is used to derive a correlation between a luma signal and a chroma signal.

In addition, the present embodiment can be applied in various ways.

Figure 20:
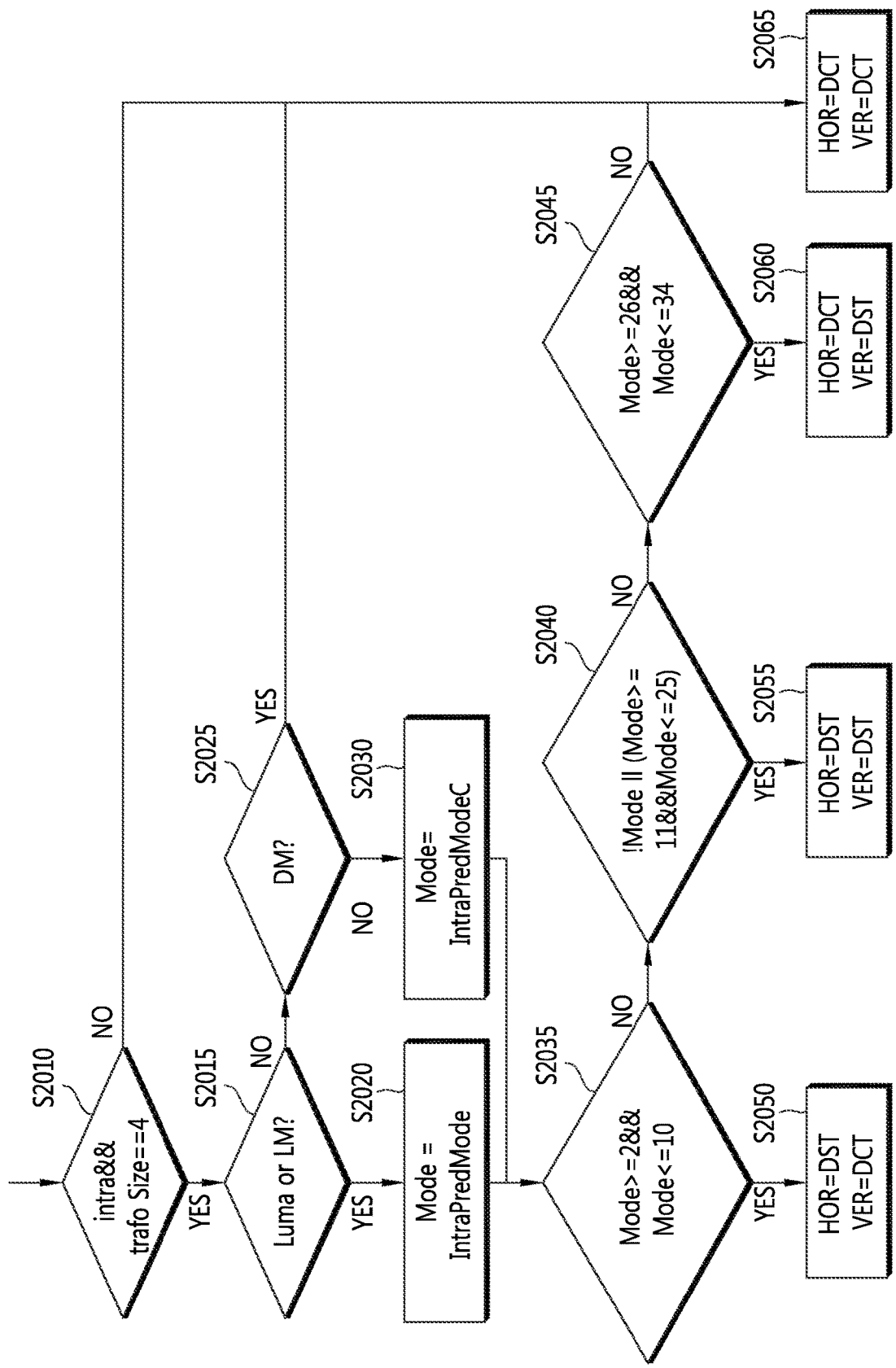
FIG. 20 is a flowchart illustrating an example of a method of selectively deriving a frequency transform method for the residual picture of a chroma signal based on an intra-prediction direction mode according to the present embodiment.

[Embodiment 5] A Method and Apparatus for Selectively Deriving a Frequency Transform Method for the Residual Picture of a Chroma Signal Depending on an Intra-Prediction Direction Mode FIG. 20 is a flowchart illustrating an example of a method of selectively deriving a frequency transform method for the residual picture of a chroma signal based on an intra-prediction direction mode according to the present embodiment.

Referring to FIG. 20, first, a current block has been subjected to intra-frame encoding 'Intra', and whether or not the current block has a 4×4 size (trafoSize (or iWidth)=4) is determined at step S2010. First, if the current block has been subjected to intra-frame encoding 'Intra' and the current block has a 4×4 size (trafoSize (or iWidth)=4), integer DST or integer DCT can be applied to a frequency transform method for the current block. If the current block does not have a 4×4 size (trafoSize (or iWidth)=4), DCT can be applied to a frequency transform method for the current block at step S2065.

Next, if the current block is a luma block or a chroma block and an intra-prediction direction mode for the chroma block is the LM at step S2015, an intra-prediction direction mode 'IntraPredMode' for the luma signal is obtained at step S2020. Here, the intra-prediction direction mode for the luma signal of the current block can be used to derive a frequency transform method for the residual pictures of the luma signal and the chroma signal.

If an intra-prediction direction mode for the chroma block is not the LM at step S2015, whether or not the chroma block is the DM is determined at step S2025.

If the current block is the chroma block and is a DM block, DCT can be applied to a frequency transform method for the current block at step S2065. If the current block is the chroma block, but is not a DM block, the intra-prediction direction mode for the chroma signal can be used to derive a frequency transform method for the residual picture of the chroma signal at step S2030.

Here, if the chroma block has been encoded in DM, DST, DCT, or other frequency transform methods can be applied to an intra-prediction direction mode corresponding to the EM (e.g., a planar mode PLANAR, a mean mode DC, a horizontal mode HOR, a vertical mode VER, or a mode located at an eighth place in a vertical direction (e.g., Ver+8 or No. 34 mode)), from the DMs.

Next, if the intra-prediction direction mode for the current block (i.e., the luma and chroma signal blocks) is 2 or more and 10 or less at step S2035, integer DST can be applied to a frequency transform method for the current block (i.e., the luma and chroma signal blocks) in a horizontal direction and integer DCT can be applied to a frequency transform method for the current block (i.e., the luma and the chroma signal blocks) in a vertical direction at step S2050.

In contrast, if the intra-prediction direction mode for the current block (i.e., the luma and chroma signal blocks) is 0 (PLANAR) or is 11 or more and 25 or less at step S2040, integer DST can be applied to a frequency transform method for the current block (i.e., the luma and chroma signal blocks) in both horizontal and vertical directions at step S2055.

In contrast, if the intra-prediction direction mode for the current block (i.e., the luma and chroma signal blocks) is 26 or more and 34 or less at step S2045, integer DCT can be applied to a frequency transform method for the current block (i.e., the luma and chroma signal blocks) in a horizontal direction and integer DST can be applied to a frequency transform method for the current block (i.e., the luma and chroma signal blocks) in a vertical direction at step S2060.

If the intra-prediction direction mode for the current block (i.e., the luma and chroma signal blocks) is not 26 or more and 34 or less at step S2045, integer DCT can be applied to a frequency transform method for the current block (i.e., the luma and chroma signal blocks) in both horizontal and vertical directions at step S2064.

The method of selectively applying a frequency transform method can be applied in various ways as in any one of 1 to 3 below.

1. If a chroma block has been encoded in DM, DST, DCT, or other frequency transform methods can be applied to only an intra-prediction direction mode corresponding to the EM If an encoding mode 'PredMode' for the current block is an intra-prediction mode 'Intra' and a value of Log 2(nW*nH) is 4, parameters horizTrType and vertTrType according to Table 13 are used depending on intra-prediction direction modes for a luma signal. In the case of a chroma signal, if the intra-prediction encoding mode of the chroma signal is smaller than 4, the parameters horizTrType and vertTrType according to Table 13 are used depending on intra-prediction direction modes for the chroma signal. In contrast, if an encoding mode for the chroma signal is Intra_FromLuma (LM), the parameters horizTrType and vertTrType according to Table 13 are used depending on intra-prediction direction modes for a luma signal. If the encoding mode for the chroma signal is not Intra_FromLuma (LM), the parameters horizTrType and vertTrType are set to 0.

TABLE 13

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |
| IntraPredMode | 18 | 19 | 20 | 21 | 22 | 23 | 24 | 25 | 26 | 27 | 28 | 29 | 30 | 31 | 32 | 33 | 34 | |
| vertTrType | 1 | 1 | 1 | 1 | 1 | 1 | 1 | 1 | 1 | 1 | 1 | 1 | 1 | 1 | 1 | 1 | 1 | |
| horizTrType | 1 | 1 | 1 | 1 | 1 | 1 | 1 | 1 | 0 | 0 | 0 | 0 | 0 | 0 | 0 | 0 | 0 | |

(planar mode PLANAR, a mean mode DC, a horizontal mode HOR, a vertical mode VER, or a mode located at an eighth place in a vertical direction (Ver+8 or No. 34 mode)), from among the DMs.

2. If a chroma block has been encoded in the LM, DST, DCT, or other frequency transform methods can be applied to only an intra-prediction direction mode corresponding to the EM (planar mode PLANAR, a mean mode DC, a horizontal mode HOR, a vertical mode VER, or a mode located at an eighth place in a vertical direction (Ver+8 or No. 34 mode)), from among intra-prediction direction modes derived from a luma signal.

3. Only when an intra-prediction direction mode is PLANAR or DC, DST, DCT, or other frequency transform methods can be selectively applied. In other modes, DST, DCT, or other frequency transform methods can be fixedly applied. In another embodiment, the reverse is possible.

In addition, a frequency transform method can be derived in various ways.

A method of performing the transform process for the scaled transform coefficients by incorporating the method of FIG. 20 is as follows.

A Transform Process for Scaled Transform Coefficients into which the Example of FIG. 20 has been Incorporated In this case, the input is as follows.

The width of a current transform block: nW

The height of the current transform block: nH

An array of scaled transform coefficients having an element dij: (nW×nH) array d An index for the luma signal and the chroma signal of a current block: cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

In this case, the output is as follows.

An array for a residual signal obtained by inversely transforming the scaled transform coefficients: (nW×nH) array r An inverse transform process is performed on the scaled transform coefficients using the parameters horizTrType and vertTrType value. First, the sizes nW and nH and scaled transform coefficients array 'nW×nH array d' of the current block and the parameter horizTrType are received, 1-D inverse transform is performed in a horizontal direction, and an array 'nW×nH array e' is output as a result of the 1-D inverse transform.

Next, an array 'nW×nH array e' is received, and an array 'nW×nH array g' is derived as in Equation 13 using the array.

$$g_{ij} = \text{Clip3}(-32768, 32767, (e_{ij}+64)>>7) \quad <\text{Equation 13}>$$

Next, the sizes nW and nH and array 'nW×nH array g' of the current block and the parameter vertTrType are received, and 1-D inverse transform is performed in a vertical direction.

Next, an array 'nW×nH array r' for the residual signals is set based on cIdx as in Equation 14.

$$r_{ij} = (f_{ij}+(1<<(\text{shift}-1)))>>\text{shift} \quad <\text{Equation 14}>$$

Here, when cIdx is 0, shift=20−BitDepth$_Y$. When cIdx is not 0, shift=20−BitDepth$_C$. BitDepth indicates the number of bits (e.g., 8 bits) of a sample for a current picture.

Figure 21:
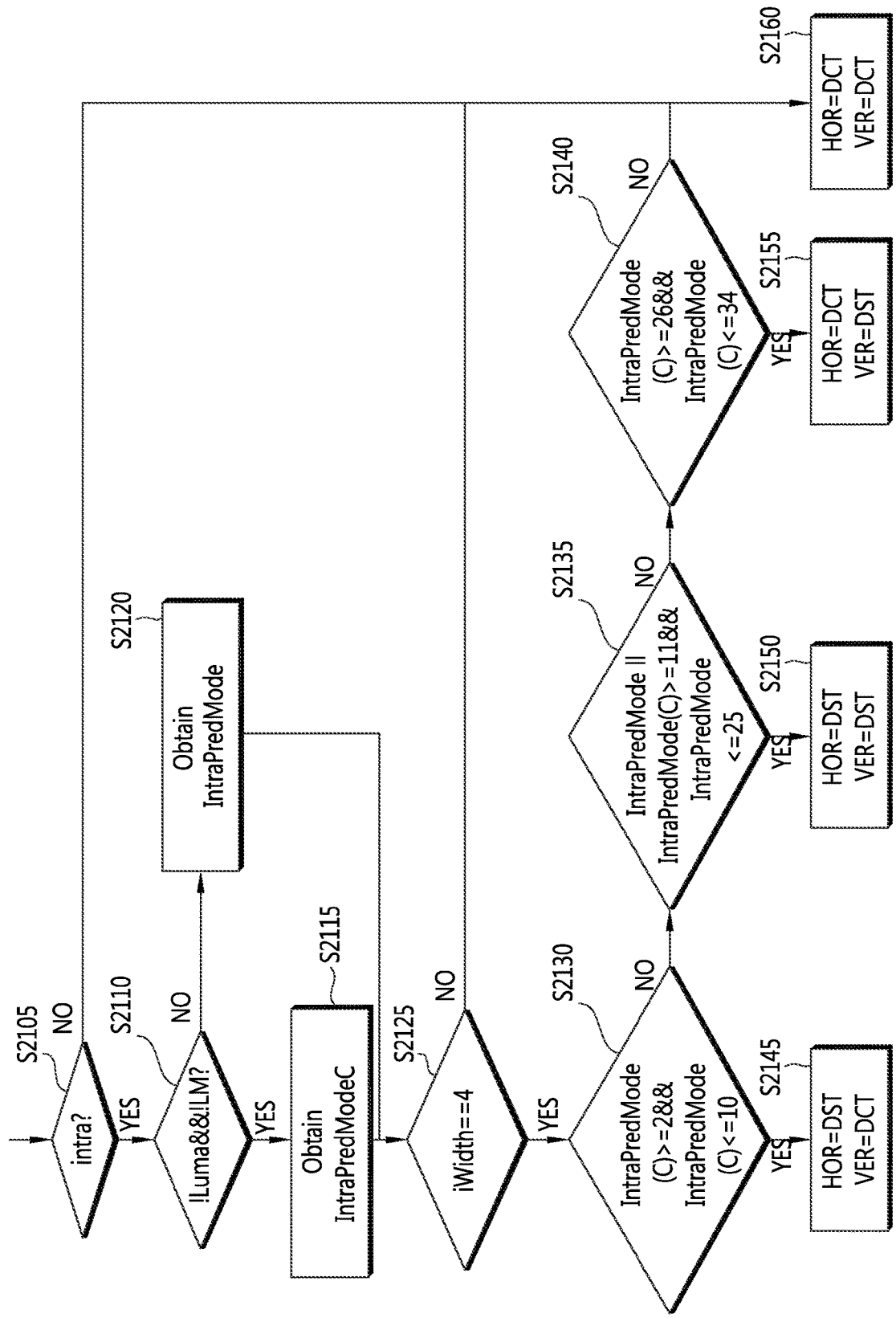
FIG. 21 is a flowchart illustrating another example of a method of selectively deriving a frequency transform method for the residual picture of a chroma signal based on an intra-prediction direction mode according to the present embodiment.

FIG. 21 is a flowchart illustrating another example of a method of selectively deriving a frequency transform method for the residual picture of a chroma signal based on an intra-prediction direction mode according to the present embodiment.

Referring to FIG. 21, first, if a current block has not been subjected to intra-frame encoding 'Intra' at step S2105, integer transform or integer DCT can be applied to frequency transform methods for the luma signal and the chroma signal of the current block at step S2160.

If the current block has been subjected to intra-frame encoding 'Intra', whether or not the current block is a luma signal block and the encoding mode of the current block is the LM is determined at step S2110.

If, as a result of the determination, it is determined that the current block is not a luma signal and the encoding mode of the current block is not the LM, an intra-prediction direction mode for the chroma signal is obtained at step S2120. If, as a result of the determination, it is determined that the current block is a luma signal and the encoding mode of the current block is the LM, an intra-prediction direction mode for a luma signal is obtained at step S2115.

Here, the intra-prediction direction mode for the luma signal of the current block can be used to derive a frequency transform method for the residual picture of the luma signal. Here, the intra-prediction direction mode for the chroma signal of the current block can be used to derive a frequency transform method for the residual picture of the chroma signal.

Furthermore, if the chroma signal of the current block has been encoded in the LM, the intra-prediction direction mode for the luma signal of the current block can be used to derive a frequency transform method for the residual picture of the chroma signal.

Next, whether or not the current block has a 4×4 size (iWidth==4) is determined at step S2125. If, as a result of the determination, it is determined that the current block does not have a 4×4 size (iWidth==4), integer transform or integer DCT can be applied to frequency transform methods for the luma signal and the chroma signal of the current block at step S2160. If, as a result of the determination, it is determined that the current block has a 4×4 size (iWidth==4), the intra-prediction direction mode of the current block is checked.

Here, when deriving a frequency transform method for the luma signal, IntraPredMode(C) is changed into IntraPredMode (i.e., an intra-prediction direction mode for the luma signal). When deriving a frequency transform method for the chroma signal, IntraPredMode(C) is changed into IntraPredModeC (i.e., an intra-prediction direction mode for the chroma signal).

If the intra-prediction direction mode of the current block is 2 or more and 10 or less, at step S2130), integer DST can be applied to a frequency transform method for the current block in a horizontal direction and integer DCT can be applied to a frequency transform method for the current block in a vertical direction at step S2145.

In contrast, if the intra-prediction direction mode of the current block is 0 or is 11 or more and 25 or less at step S2135, integer DST can be applied to a frequency transform method for the current block in both horizontal and vertical directions at step S2150.

In contrast, if the intra-prediction direction mode of the current block is 26 or more and 34 or less at step S2140, integer DCT can be applied to a frequency transform method for the current block in a horizontal direction and integer DST can be applied to a frequency transform method for the current block in a vertical direction at step S2155.

If the intra-prediction direction mode of the current block is not 26 or more and 34 or less at step S2140, integer DCT can be applied to a frequency transform method for the residual pictures of the luma signal and the chroma signal of the current block in both horizontal and vertical directions at step S2160.

A method of incorporating the method according to the example of FIG. 21 into a transform process for scaled transform coefficients is as follows.

A Transform Process for Scaled Transform Coefficients into which the Example of FIG. 21 has been Incorporated In this case, the input is as follows.

The width of a current transform block: nW

The height of the current transform block: nH

An array of scaled transform coefficients having an element dij: (nW×nH) array d An index for the luma signal and the chroma signal of a current block: cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

In this case, the output is as follows.

An array for a residual signal obtained by inversely transforming the scaled transform coefficients: (nW×nH) array r If an encoding mode 'PredMode' for the current block is an intra-prediction mode 'Intra' and a value of Log 2(nW*nH) is 4, parameters horizTrType and vertTrType according to Table 14 are used depending on intra-prediction direction modes for a luma signal. In the case of the chroma signal, the parameters horizTrType and vertTrType according to Table 14 are used depending on an intra-prediction direction mode for a chroma signal. If an encoding mode for the chroma signal is Intra_FromLuma (LM), the parameters horizTrType and vertTrType according to Table 14 are used depending on an intra-prediction direction mode for the luma signal. If an encoding mode for the chroma signal is not Intra_FromLuma (LM), the parameters horizTrType and vertTrType are set to 0.

TABLE 14

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |
| IntraPredMode | 18 | 19 | 20 | 21 | 22 | 23 | 24 | 25 | 26 | 27 | 28 | 29 | 30 | 31 | 32 | 33 | 34 | |
| vertTrType | 1 | 1 | 1 | 1 | 1 | 1 | 1 | 1 | 1 | 1 | 1 | 1 | 1 | 1 | 1 | 1 | 1 | |
| horizTrType | 1 | 1 | 1 | 1 | 1 | 1 | 1 | 1 | 0 | 0 | 0 | 0 | 0 | 0 | 0 | 0 | 0 | |

An inverse transform process is performed on the scaled transform coefficients using the parameters horizTrType and vertTrType value. First, the sizes nW and nH and scaled transform coefficients array 'nW×nH array d' of the current block and the parameter horizTrType are received, 1-D inverse transform is performed in a horizontal direction, and an array 'nW×nH array e' is output as a result of the 1-D inverse transform.

Next, an array 'nW×nH array e' is received, and an array 'nW×nH array g' is derived as in Equation 15 using the array.

$$g_{ij} = \text{Clip3}(-32768, 32767, (e_{ij}+64) >> 7) \quad \text{<Equation 16>}$$

Next, the sizes nW and nH and array 'nW×nH array g' of the current block and the parameter vertTrType are received, and 1-D inverse transform is performed in a vertical direction.

Next, an array 'nW×nH array r' for the residual signals is set based on cIdx as in Equation 16.

$$r_{ij}=(f_{ij}+(1<<(\text{shift}-1)))>>\text{shift} \qquad <\text{Equation 16}>$$

Here, when cIdx is 0, shift=20−BitDepth$_Y$. When cIdx is not 0, shift=20−BitDepth$_C$. BitDepth indicates the number of bits (e.g., 8 bits) of a sample for a current picture.

The above-described methods can be differently applied to an application scope depending on the size of all blocks, a CU depth, or a TU depth.

A parameter (i.e., information about the size or depth) used to determine the application scope as described above may be set so that a predetermined value is used in an encoder and a decoder, or a predetermined value may be used depending on a profile or level. For example, when an encoder writes a parameter value in a bit stream, a decoder may obtain a value from the bit stream and use the value.

If the application scope is different depending on a CU depth, one of the following 3 methods can be used as illustrated in Table 15: A method A) of applying the application scope to only a depth equal to or greater than a specific depth, a method B) of applying the application scope to only a depth equal to or smaller than a specific depth, and a method C) of applying the application scope to only a specific depth.

Table 15 shows an example of methods of determining the application scope in which the methods of the present invention is applied when a specific CU (or TU) depth is 2. In Table 15, 'O' indicates that the application scope is applied to a corresponding depth, and 'X' indicates that the application scope is not applied to a corresponding depth.

TABLE 15

| CU (OR TU) DEPTH INDICATING APPLICATION SCOPE | METHOD A | METHOD B | METHOD C |
|---|---|---|---|
| 0 | × | O | × |
| 1 | × | O | × |
| 2 | O | O | O |
| 3 | O | × | × |
| 4 | O | × | × |

If the methods of the present invention are not applied to all depths, it may be indicated using a specific indicator (or flag) or may be represented by signaling a value that is 1 greater than a maximum value of a CU depth using as a CU depth value indicative of the application scope.

Furthermore, the above-described methods can also be applied to a case where a luma signal has a different resolution from a chroma signal.

For example, assuming that the size of a chroma signal is ¼ of the size of a luma signal (e.g., a luma signal has a 416×240 size and a chroma signal has a 208×4120 size), a luma signal 8×8 block is equal to a chroma signal 4×4 block.

Figure 22:
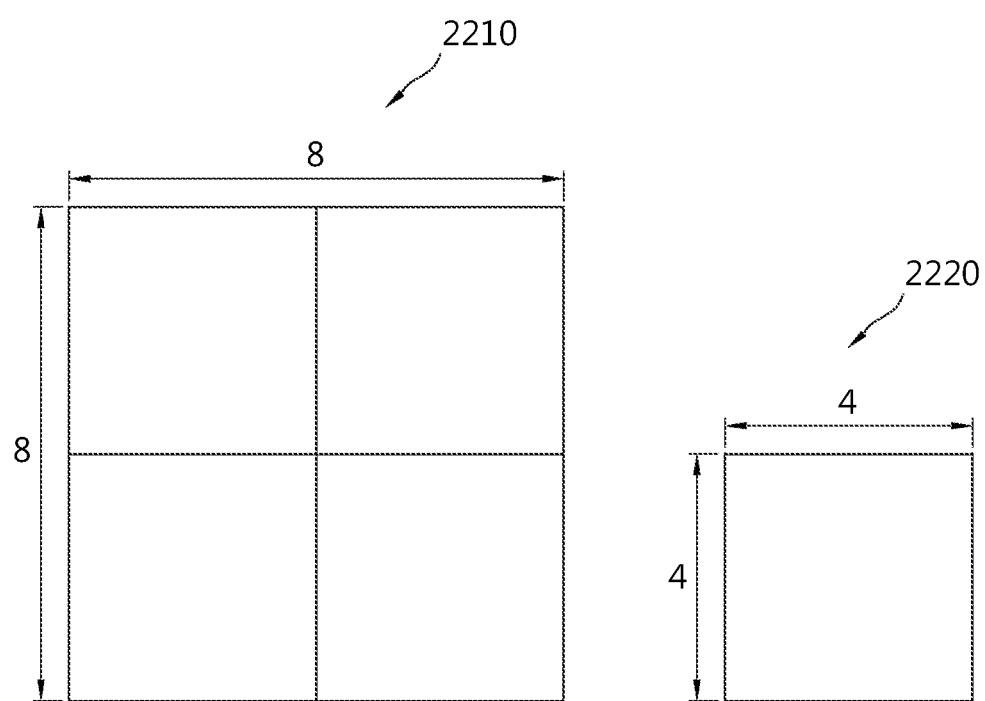
FIG. 22 shows an example of a difference in the resolution between a luma block and a chroma block.

FIG. 22 shows an example of a difference in the resolution between a luma block and a chroma block. The example of FIG. 22 illustrates that the luma signal is an 8×8 block 2210 and the chroma signal is a 4×4 block 2220.

In the example of FIG. 22, the luma signal 2210 can include four 4×4 blocks, and each of the 4×4 blocks can have an intra-prediction direction mode. In contrast, the chroma signal 2220 may not be partitioned into 2×2 blocks.

In this case, the chroma signal can have one intra-prediction direction mode for the 4×4 block. Here, if the chroma signal has been encoded in Intra_FromLuma (LM) (or if the chroma signal has been encoded in DM (i.e., when an intra-prediction direction mode for the luma signal is used as an intra-prediction direction mode for the chroma signal without change)), one of the four 4×4 blocks can be used as the intra-prediction direction mode for the luma signal used to derive a frequency transform method for the residual picture of the chroma signal.

In order to selectively apply a frequency transform method to the residual picture of the chroma signal, one of the following 1 to 4 can be applied to a method of deriving an intra-prediction direction in various ways.

1. The intra-prediction direction mode in the up-left block of the luma signal block can be used.

2. The intra-prediction direction mode in the up-right, down-left, or down-right block of the luma signal block can be used.

3. The mean value or middle value of the four luma signal blocks can be used.

4. The mean value or middle value using intra-prediction direction modes for the four luma signal blocks of a current block and chroma signal blocks neighboring the current block can be used.

In addition, an intra-prediction direction mode for the chroma signal can be derived using various methods.

Figure 23:
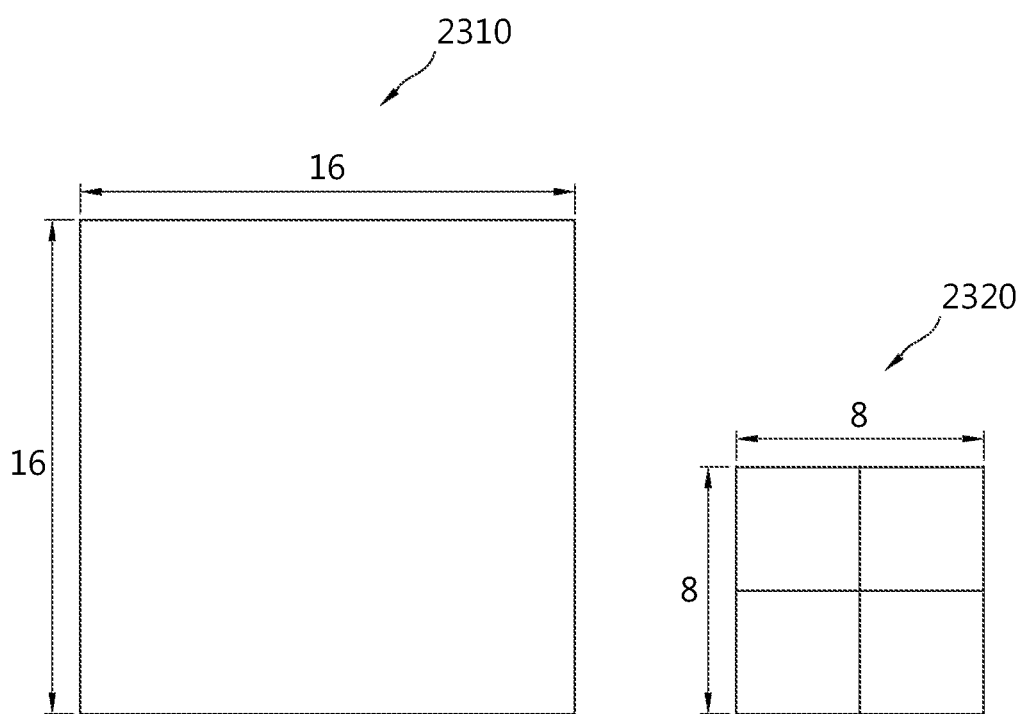
FIG. 23 is another example illustrating a difference in the resolution between a luma block and a chroma block.

FIG. 23 is another example illustrating a difference in the resolution between a luma block and a chroma block.

As in the example of FIG. 23, a luma signal 2310 can include one 16×16 block and can have one intra-prediction mode. In contrast, a chroma signal 2320 can be partitioned into four 4×4 blocks. Here, each of the 4×4 blocks can have an intra-prediction direction mode.

Here, if the chroma signal has been encoded in Intra_FromLuma (LM) (or if the chroma signal has been encoded in DM (i.e., when an intra-prediction direction mode for the luma signal is used as an intra-prediction direction mode for the chroma signal without change)), an intra-prediction direction mode for the one luma signal can be used to derive a frequency transform method for the residual pictures of each chroma signal. In another embodiment, in order to derive the frequency transform method for the residual pictures of the chroma signal block, intra-prediction direction modes may be derived from blocks (i.e., luma blocks or chroma blocks) neighboring a current block may be derived and used.

Furthermore, the above-described method can be differently applied to a chroma block depending on the size of a luma block. Furthermore, the above-described method can be differently applied to a luma signal picture and a chroma signal picture. Furthermore, a frequency transform method can be separately applied to a horizontal direction and a vertical direction.

Table 16 schematically illustrates a combination of the methods.

TABLE 16

| SIZE OF LUMA BLOCK | SIZE OF CHROMA BLOCK | LUMA APPLIED | CHROMA APPLIED | HORIZONTAL APPLIED | VERTICAL APPLIED | METHODS |
|---|---|---|---|---|---|---|
| 4(4 × 4, 4 × 2, 2 × 4) | 2(2 × 2) | ○ or X | ○ or X | ○ or X | ○ or X | A 1, 2, ... |
| | 4(4 × 4, 4 × 2, 2 × 4) | ○ or X | ○ or X | ○ or X | ○ or X | B 1, 2, ... |
| | 8(8 × 8, 8 × 4, 4 × 8, 2 × 8, etc.) | ○ or X | ○ or X | ○ or X | ○ or X | C 1, 2, ... |
| | 16(16 × 16, 16 × 8, 4 × 16, 2 × 16, etc.) | ○ or X | ○ or X | ○ or X | ○ or X | D 1, 2, ... |
| | 32(32 × 32) | ○ or X | ○ or X | ○ or X | ○ or X | E 1, 2, ... |
| 8(8 × 8, 8 × 4, 2 × 8, etc.) | 2 (2 × 2) | ○ or X | ○ or X | ○ or X | ○ or X | F 1, 2, ... |
| | 4(4 × 4, 4 × 2, 2 × 4) | ○ or X | ○ or X | ○ or X | ○ or X | G 1, 2, ... |
| | 8(8 × 8, 8 × 4, 4 × 8, 2 × 8, etc.) | ○ or X | ○ or X | ○ or X | ○ or X | H 1, 2, ... |
| | 16(16 × 16, 16 × 8, 4 × 16, 2 × 16, etc.) | ○ or X | ○ or X | ○ or X | ○ or X | I 1, 2, ... |
| | 32(32 × 32) | ○ or X | ○ or X | ○ or X | ○ or X | J 1, 2, ... |
| 16(16 × 16, 8 × 16, 4 × 16, etc.) | 2 (2 × 2) | ○ or X | ○ or X | ○ or X | ○ or X | K 1, 2, ... |
| | 4(4 × 4, 4 × 2, 2 × 4) | ○ or X | ○ or X | ○ or X | ○ or X | L 1, 2, ... |
| | 8(8 × 8, 8 × 4, 4 × 8, 2 × 8, etc.) | ○ or X | ○ or X | ○ or X | ○ or X | M 1, 2, ... |
| | 16(16 × 16, 16 × 8, 4 × 16, 2 × 16, etc.) | ○ or X | ○ or X | ○ or X | ○ or X | N 1, 2, ... |
| | 32(32 × 32) | ○ or X | ○ or X | ○ or X | ○ or X | O 1, 2, ... |

In the modified methods of Table 16, the method 'G 1' is described below. If the size of a luma block is 8 (8×8, 8×44, 2×8, etc.) and the size of a chroma block is 4 (4×4, 4×2, 2×4), Embodiment 1 (G 1—Embodiment 1), Embodiment 2-1, Embodiment 2-2 (G 1—Embodiment 2-1 or Embodiment 2-2), and Embodiment 3 (G 1—Embodiment 3) of this specification can be applied to a luma signal, a chroma signal, a horizontal signal, and a vertical signal.

In the modified methods of Table 16, the method 'L 2' is described below. If the size of a luma block is 16 (16×16, 8×16, 4×16, etc.) and the size of a chroma block is 4 (4×4, 4×2, 2×4), Embodiment 1 (L 2—Embodiment 1), Embodiment 2-1 or Embodiment 2-2 (L 2—Embodiment 2-1 or Embodiment 2-2), and Embodiment 3 (L 2—Embodiment 3) can be applied to a luma signal, a chroma signal, and a horizontal signal and may not be applied to a vertical signal.

Here, the above-described methods can be applied to various cases, such as 1 and 2 below, in addition to a case where a current chroma block has been encoded in 'Intra_FromLuma' (LM).

1. In predicting a chroma block, the above-described methods can be applied to all methods of multiplying a reconstructed luma signal block by weight and adding an offset to a result of the multiplication.

2. In predicting a chroma block, the above-described methods can be applied to all methods of predicting a chroma block using a template shift for reconstructed luma signal and chroma signal blocks. Here, the template shift is used to derive a correlation between a luma signal and a chroma signal.

In addition, the above-described methods can be applied in various ways.

[Embodiment 6] A Method and Apparatus for Integrally Determining a Frequency Transform Method and a Scanning Method for a Chroma Signal As described above, a scanning method for the residual signal (or residual picture) of a chroma signal can be different depending on an intra-prediction direction mode for the chroma signal.

Furthermore, a frequency transform method for the residual signal (or residual picture) of a chroma signal can be different depending on an intra-prediction direction mode for the chroma signal.

A scanning method for the residual signal (or residual picture) of a chroma signal can have different encoding efficiency depending on a frequency transform method for the residual signal of the chroma signal. In contrast, a scanning method and a frequency transform method for the residual signal (or residual picture) of a chroma signal can be said to have a specific correlation because the two methods can be different depending on an intra-prediction direction mode for the chroma signal.

That is, a scanning method and a frequency transform method for the residual signal of a chroma signal can have a correlation, and the two methods can be integrated into an optimal combination. Accordingly, the scanning methods for a chroma signal in Embodiment 1 and Embodiment 2-1/Embodiment 2-2 and a frequency transform method for Embodiment 3, Embodiment 4, and Embodiment 5 can be integrally determined as in Table 17.

Table 17 shows an example of methods of integrally determining a scanning method and a frequency transform method for the residual signal of a chroma signal according to the present embodiment.

TABLE 17

| | SCANNING METHOD FOR CHROMA SIGNAL | | | FREQUENCY TRANSFORM METHOD FOR CHROMA SIGNAL | | |
|---|---|---|---|---|---|---|
| | EM | DM | LM | EM | DM | LM |
| A | ○ | | X | ○ | X | ○ |
| B | | | | X | ○ | |
| C | | | | ○ | ○ | |
| D | | | ○ | ○ | X | |
| E | | | | X | ○ | |
| F | | | | ○ | ○ | |
| O | | | X | ○ | X | |
| P | | | | X | ○ | |

TABLE 17-continued

| | SCANNING METHOD FOR CHROMA SIGNAL | | | FREQUENCY TRANSFORM METHOD FOR CHROMA SIGNAL | | |
|---|---|---|---|---|---|---|
| | EM | DM | LM | EM | DM | LM |
| Q | | | | ○ | ○ | |
| R | | ○ | | ○ | X | |
| S | | | | X | ○ | |
| T | | | | ○ | ○ | |

Table 17 shows combinations of methods of integrating determining a scanning method and a frequency transform method for the residual signal of a chroma signal. Here, EM, DM, and LM show methods of encoding intra-prediction direction modes for the chroma signal.

A mode for a chroma signal that is derived by applying an intra-prediction direction mode for a luma signal to an intra-prediction direction mode for the chroma signal without change is a Derived Mode (DM). A mode for a chroma signal in which an intra-prediction direction mode is actually encoded is an Explicit Mode (EM). The intra-prediction direction modes of a chroma signal that is encoded in the EM include a planar mode PLANAR, a mean mode DC, a horizontal mode HOR, a vertical mode VER, and a mode located at an eighth place in a vertical direction (i.e., Ver+8 or No. 34 mode).

Finally, a mode in which a chroma signal is predicted from a reconstructed luma signal is Intra_FromLuma (LM).

'A', that is, an example of the combinations of Table 17, is described below. In order to determine a frequency transform method for a chroma signal, only the EM and the LM, from among the intra-prediction direction modes for the chroma signal, are used, but the DM is not used. A frequency transform method is determined using the EM and the LM (e.g., Embodiments 3, 4, 5). Next, in order to determine a scanning method for transformed coefficients, a scanning method (e.g., Embodiments 1 and 2) is determined using the EM and the DM, from among the intra-prediction direction modes for the chroma signal.

In this case, a case where a frequency transform method is derived using the DM, from among the intra-prediction direction modes for the chroma signal, may be excluded by taking encoding efficiency into consideration. For example, in case where encoding is performed in the DM, if an intra-prediction direction mode for a chroma signal is different from an intra-prediction direction mode for a luma signal and the intra-prediction direction mode for the chroma signal is not present in the EM (e.g., a planar mode PLANAR, a mean mode DC, a horizontal mode HOR, a vertical mode VER, and a mode located at an eighth place in a vertical direction (Ver+8 or No. 34 mode)), the accuracy of the intra-prediction direction mode for the chroma signal encoded in the DM may be deteriorated because the chroma signal is inevitably encoded in the DM. For this reason, the DM may not be used to determine a frequency transform method.

'D', that is, another example of the combinations of Table 17, is described below. In order to determine a frequency transform method for a chroma signal, only the EM and the LM, from among the intra-prediction direction modes for the chroma signal, are used, but the DM is not used. A frequency transform method is determined using the EM and the LM (e.g., Embodiments 3, 4, and 5). Next, in order to determine a scanning method for transformed coefficients, a scanning method is determined using all the EM, DM, and LM, from among the intra-prediction direction modes for the chroma signal, (e.g., Embodiments 1 and 2).

In this case, a case where a scanning method is derived using the LM, from among the intra-prediction direction modes for the chroma signal, may be included by taking encoding efficiency into consideration. As described in connection with Embodiments 1 and 2, a chroma signal encoded in the LM can have a correlation with a luma signal. Accordingly, an intra-prediction direction mode for a chroma signal encoded in the LM can be almost the same as an intra-prediction direction mode of a luma signal. As a result, the intra-prediction direction mode for the chroma signal encoded in the LM can be used to determine a scanning method because the intra-prediction direction mode for the chroma signal has a similar characteristic to the intra-prediction direction mode for the luma signal.

'T', that is, yet another example of the combinations of Table 17, is described below. In order to determine a frequency transform method for a chroma signal, all the EM, DM, and LM, from among the intra-prediction direction modes for the chroma signals, are used. A frequency transform method is determined using the EM, DM, and LM (e.g., Embodiments 3, 4, and 5). Next, in order to determine a scanning method for transformed coefficients, a scanning method (e.g., Embodiments 1 and 2) is determined using all the EM, DM, and LM, from among the intra-prediction direction modes for the chroma signal.

As yet further another example of the combinations of Table 17, if the 'T' method is modified, the EM, DM, and LM, from among the intra-prediction direction mode for a chroma signal, can be used to determine a frequency transform method for the chroma signal. Here, a frequency transform method can be determined (e.g., Embodiments 3, 4, and 5) only when an intra-prediction direction mode for a real and reconstructed chroma signal, from among the EM, DM, and LM, is the EM (e.g., a planar mode PLANAR, a mean mode DC, a horizontal mode HOR, a vertical mode VER, or a mode located at an eighth place in a vertical direction (Ver+8 or No. 34 mode)). Furthermore, all the EM, DM, and LM can be used to determine a scanning method for transformed coefficients. Here, a scanning method (e.g., Embodiments 1 and 2) can be used only when an intra-prediction direction mode for a real and reconstructed chroma signal, from among the EM, DM, and LM, is the EM (e.g., a planar mode PLANAR, a mean mode DC, a horizontal mode HOR, a vertical mode VER, or a mode located at an eighth place in a vertical direction (Ver+8 or No. 34 mode)).

[Embodiment 7] A Method and Apparatus for Integrating Tables for Determining a Frequency Transform Method and a Scanning Method for a Chroma Signal It can be said that a scanning method and a frequency transform method for the residual signal (or residual picture) of a chroma signal have a close correlation because the two methods can be different depending on an intra-prediction direction mode for the chroma signal.

Therefore, in the present embodiment, tables used to determine the two methods can be integrated and used depending on an intra-prediction direction mode.

Table 18 shows an example of frequency transform methods and scanning methods derived based on intra-prediction direction modes according to the present embodiment.

TABLE 18

| | A | | | | | | | | | | |
|---|---|---|---|---|---|---|---|---|---|---|---|
| | 2~5 | 6~9 | 10 | 11~14 | 15~17 | 18 | 19~21 | 22~25 | 26 | 27~30 | 31~34 |
| Vertical Frequency Transform Method | DCT | | | | | DST | | | | DST | |
| Horizontal Frequency Transform Method | DST | | | | | | | | | DCT | |
| SCANNING METHOD | DIAG | | VER | | | DIAG | | | HOR | | DIAG |

Furthermore, Table 19 shows another example of frequency transform methods and scanning methods that are derived based on intra-prediction direction modes according to the present embodiment.

Tables 18 to 21 shows examples in which the tables of the frequency transform methods and the scanning methods derived based on the intra-prediction direction modes are integrated.

TABLE 19

| | B | | | | | | | | | | |
|---|---|---|---|---|---|---|---|---|---|---|---|
| | 2~5 | 6~9 | 10 | 11~14 | 15~17 | 18 | 19~21 | 22~25 | 26 | 27~30 | 31~34 |
| Vertical Frequency Transform Method | DST | | DCT | | | DST | | | DST | | DST |
| Horizontal Frequency Transform Method | | | DST | | | | | | DCT | | |
| SCANNING METHOD | DIAG | | VER | | | DIAG | | | HOR | | DIAG |

Table 20 shows yet another example of frequency transform methods and scanning method that are derived based on intra-prediction direction modes according to the present embodiment.

For example, referring to Table 19, if an intra-prediction direction mode is 2~5, DST is used as vertical and horizontal frequency transform methods and up-right diagonal scanning DIAG is used as a scanning method. If an intra-

TABLE 20

| | C | | | | | | | | | | |
|---|---|---|---|---|---|---|---|---|---|---|---|
| | 2~5 | 6~9 | 10 | 11~14 | 15~17 | 18 | 19~21 | 22~25 | 26 | 27~30 | 31~34 |
| Vertical Frequency Transform Method | DCT | | DCT | | | DCT | | | DST | | DCT |
| Horizontal Frequency Transform Method | | | DST | | | | | | DCT | | |
| SCANNING METHOD | DIAG | | VER | | | DIAG | | | HOR | | DIAG |

Table 21 shows yet further another example of frequency transform methods and scanning methods that are derived based on intra-prediction direction modes according to the present embodiment.

prediction direction mode is 6~14, DCT is used as a vertical frequency transform method, DST is used as a horizontal frequency transform method, and VER (i.e., vertical) is used as a scanning method.

TABLE 21

| | D | | | | | | | | | | |
|---|---|---|---|---|---|---|---|---|---|---|---|
| | H--(4) 2~5 | H-(4) 6~9 | H 10 | H+(4) 11~14 | H++(3) 15~17 | D 18 | V--(3) 19~21 | V--(4) 22~25 | V 26 | V+(4) 27~30 | V++(4) 31~34 |
| Vertical Frequency Transform Method | | DCT | | | | DCT | | | | DST | |
| Horizontal Frequency Transform Method | | DST | | | | | | | | DCT | |
| SCANNING METHOD | DIAG | | VER | | | DIAG | | | HOR | | DIAG |

If an intra-prediction direction mode is 15~21, DST is used as vertical and horizontal frequency transform methods and DIAG (i.e., up-right diagonal scanning) is used as a scanning method. If an intra-prediction direction mode is 22~30, DST is used as a vertical frequency transform method, DCT is used as a horizontal frequency transform method, and HOR (i.e., horizontal) is used as a scanning method.

If an intra-prediction direction mode is 31~34, DST is used as vertical and horizontal frequency transform methods and DIAG (i.e., up-right diagonal) is used as a scanning method.

If a frequency transform method and a scanning method are taken into consideration based on an intra-prediction direction mode as in Table 19, there is an advantage in that unity can be implemented depending on VER and HOR unlike in Table 18.

Here, the above-described methods can also be applied to a case 1 or 2 below in addition to a case where a current chroma block has been encoded in the LM (Intra_FromLuma).

1. In predicting a chroma block, the above-described methods can be applied to all methods of multiplying a reconstructed luma signal block by weight and adding an offset to a result of the multiplication.

2. In predicting a chroma block, the above-described methods can be applied to all methods of predicting a chroma block using a template shift for reconstructed luma signal and chroma signal blocks. Here, the template shift is used to derive a correlation between a luma signal and a chroma signal.

In addition, the above-described methods can be applied in various ways.

Figure 24:
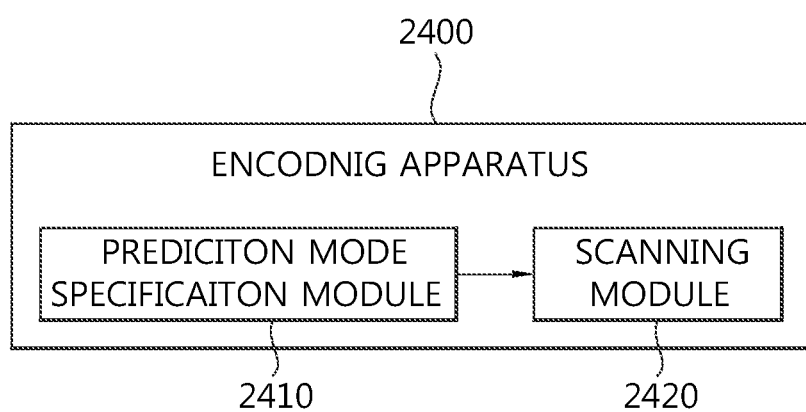
FIG. 24 shows another example of an encoding apparatus according to the present invention.

FIG. 24 shows another example of an encoding apparatus according to the present invention.

Referring to FIG. 24, the encoding apparatus 2400 includes a prediction mode specification module 2410 and a scanning module 2420.

The prediction mode specification module 2410 specifies a prediction mode applied to a current block. For example, the prediction mode specification module 2410 can specify an intra-prediction mode that has been applied to the luma sample and/or the chroma sample of a current block.

Here, the prediction mode specification module 2410 may be placed in front of the intra-prediction module of FIG. 1 and configured to specify an intra-prediction mode to be applied to a current block or may be placed in the rear of the intra-prediction module and configured to output information indicative of an intra-prediction mode applied to a current block.

The intra-prediction mode is the same as that described with reference to FIG. 6.

The scanning module 2420 can scan the chroma signal and/or the luma signal of a current block. Here, the scanning module 2420 can determine a scanning type to be applied to the current block in response to an intra-prediction mode for the current block.

A detailed method of determining a scanning type (or method) to be applied to a current block has been described in detail in connection with the embodiments of this specification.

Figure 25:
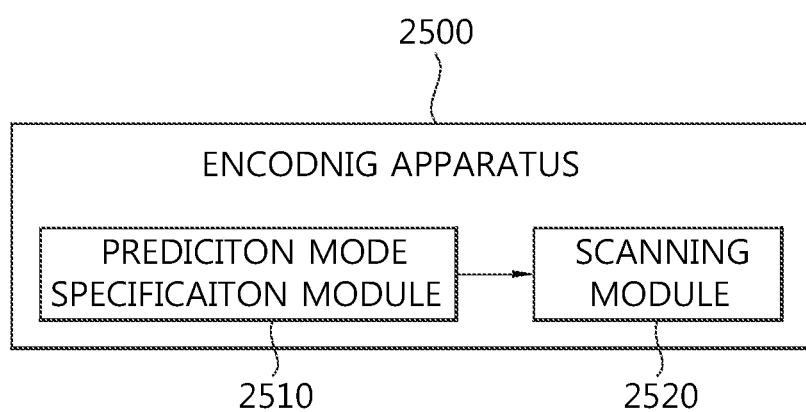
FIG. 25 shows another example of a decoding apparatus according to the present invention.

FIG. 25 shows another example of a decoding apparatus according to the present invention.

Referring to FIG. 25, the decoding apparatus 2500 includes a prediction mode specification module 2510 and a scanning module 2520.

The prediction mode specification module 2510 specifies a prediction mode applied to a current block. For example, the prediction mode specification module 2510 can specify an intra-prediction mode applied to the luma sample and/or the chroma sample of a current block.

The intra-prediction mode is the same as that described with reference to FIG. 6.

The scanning module 2520 can scan the chroma signal and/or the luma signal of a current block. Here, the scanning module 2520 can determine a scanning type to be applied to the current block in response to an intra-prediction mode for the current block.

A detailed method of determining a scanning type (or method) to be applied to a current block has been described in detail in connection with the embodiments of this specification.

In the above exemplary system, although the methods have been described based on the flowcharts in the form of a series of steps or blocks, the present invention is not limited to the sequence of the steps, and some of the steps can be performed in a different order from that of other steps or can be performed simultaneous to other steps. Furthermore, the aforementioned embodiments include various examples. For example, a combination of some embodiments should also be understood as an embodiment of the present invention.

The invention claimed is:

1. A method for decoding a video signal, comprising:
deriving an intra prediction mode of a current block;
   determining a scan type of the current block based on the intra prediction mode of the current block;
   deriving residual coefficients of the current block based on the scan type of the current block;
   determining a transform type of the current block to be a DCT (Discrete Cosine Transform) or a DST (Discrete Sine Transform); and
   performing an inverse-transform on the residual coefficients based on the transform type,
   wherein when a size of the current block corresponds to 4×4 and a color component of the current block is a luma component, the inverse-transform is performed by using DST in horizontal and vertical transform directions, for all intra prediction direction mode and a planar mode of the current block.

2. A method for encoding a video signal, comprising:
deriving an intra prediction mode of a current block;
determining a scan type of the current block based on the intra prediction mode of the current block;
deriving residual coefficients of the current block based on the scan type of the current block;
determining a transform type of the current block to be a DCT (Discrete Cosine Transform) or a DST (Discrete Sine Transform); and
performing an inverse-transform on the residual coefficients based on the transform type,
wherein when a size of the current block corresponds to 4×4 and a color component of the current block is a luma component, the inverse-transform is performed by using DST in horizontal and vertical transform directions, for all intra prediction direction mode and a planar mode of the current block.

3. A method for transmitting a bitstream formed by a method of encoding a video, the method of encoding the video comprising:
deriving an intra prediction mode of a current block;
determining a scan type of the current block based on the intra prediction mode of the current block;

deriving residual coefficients of the current block based on the scan type of the current block;
determining a transform type of the current block to be a DCT (Discrete Cosine Transform) or a DST (Discrete Sine Transform); and
performing an inverse-transform on the residual coefficients based on the transform type,
wherein when a size of the current block corresponds to 4×4 and a color component of the current block is a luma component, the inverse-transform is performed by using DST in horizontal and vertical transform directions, for all intra prediction direction mode and a planar mode of the current block.

* * * * *